(12) United States Patent
Connolly

(10) Patent No.: US 11,930,943 B2
(45) Date of Patent: Mar. 19, 2024

(54) INTERACTIVE MULTI-CHAMBER CONTAINER

(71) Applicant: Sean Michel Connolly, Paterson, NJ (US)

(72) Inventor: Sean Michel Connolly, Paterson, NJ (US)

(*) Notice: Subject to any disclaimer, the term of this patent is extended or adjusted under 35 U.S.C. 154(b) by 801 days.

(21) Appl. No.: 16/817,362

(22) Filed: Mar. 12, 2020

(65) Prior Publication Data

US 2020/0323370 A1    Oct. 15, 2020

Related U.S. Application Data

(60) Provisional application No. 62/833,160, filed on Apr. 12, 2019.

(51) Int. Cl.
| | |
|---|---|
| *A47G 19/22* | (2006.01) |
| *A47G 19/02* | (2006.01) |
| *B65D 25/04* | (2006.01) |
| *B65D 25/20* | (2006.01) |
| *B65D 75/58* | (2006.01) |
| *G09B 3/06* | (2006.01) |
| *G09B 7/06* | (2006.01) |
| *A47G 19/12* | (2006.01) |

(52) U.S. Cl.
CPC ....... *A47G 19/2227* (2013.01); *A47G 19/025* (2013.01); *B65D 25/04* (2013.01); *B65D 25/20* (2013.01); *B65D 75/5816* (2013.01); *B65D 75/5833* (2013.01); *G09B 3/06* (2013.01); *G09B 7/06* (2013.01); *A47G 2019/122* (2013.01); *B65D 2231/022* (2013.01)

(58) Field of Classification Search
CPC ............ A47G 2019/122; A47G 21/004; A63F 2009/0016; A63F 2009/0053; B65D 5/40; B65D 85/72–80
USPC .......... 434/348, 322, 127; 215/230; 273/302
See application file for complete search history.

(56) References Cited

U.S. PATENT DOCUMENTS

| | | | |
|---|---|---|---|
| 4,733,863 A | 5/1988 | Novotny | |
| 4,919,293 A * | 4/1990 | Buckley | ................... B65D 1/30 220/23.2 |

(Continued)

FOREIGN PATENT DOCUMENTS

| | | |
|---|---|---|
| BE | 905458 | 1/1987 |
| EP | 0937657 | 8/1999 |
| KR | 200272994 Y1 * | 2/2002 |

*Primary Examiner* — Mollie Impink
(74) *Attorney, Agent, or Firm* — Erickson Law Group, PC

(57) ABSTRACT

A multi-chamber container with an educational function. The multi-chamber container is designed to provide a housing, with a sidewall extending between a bottom wall and a top wall, that can store food or beverage substances therein. The housing includes a primary chamber and at least one secondary chamber. The primary chamber is accessible via a primary opening, while each secondary chamber is individually accessible via a secondary opening. The container provides an educational function in that the primary chamber stores a desired liquid or solid material and the secondary chamber is empty. The primary and secondary openings are Indistinguishable to the consumer until opened from a closed state. The selection of the primary opening corresponds to a correct answer to a question displayed on, or associated with, the container.

23 Claims, 22 Drawing Sheets

(56) References Cited

U.S. PATENT DOCUMENTS

| | | | | |
|---|---|---|---|---|
| 4,955,503 | A * | 9/1990 | Propes | A47G 19/2266 |
| | | | | 220/555 |
| 5,267,646 | A | 12/1993 | Noue et al. | |
| 5,310,564 | A * | 5/1994 | Kimm | B65D 77/08 |
| | | | | 206/217 |
| 5,938,053 | A | 8/1999 | Verbovsky et al. | |
| 8,827,160 | B1 | 9/2014 | Pascal et al. | |
| 10,005,589 | B2 * | 6/2018 | Shakeri Clark | B65D 51/18 |
| 2002/0197592 | A1 * | 12/2002 | Wolfson | G09B 19/02 |
| | | | | 434/250 |
| 2004/0118710 | A1 | 6/2004 | Bourque et al. | |
| 2004/0253567 | A1 | 12/2004 | Kaye | |
| 2005/0109796 | A1 | 5/2005 | Bourque et al. | |
| 2006/0160051 | A1 * | 7/2006 | Trowbridge-Kitchens | G09B 19/00 |
| | | | | 434/188 |
| 2006/0219719 | A1 * | 10/2006 | Dixon | B65D 1/04 |
| | | | | 220/495.06 |
| 2007/0246379 | A1 | 10/2007 | Kuenzel | |
| 2007/0267416 | A1 * | 11/2007 | Eichenbaum | B65D 1/04 |
| | | | | 220/524 |
| 2008/0156375 | A1 * | 7/2008 | Wild | B65B 39/06 |
| | | | | 29/890.12 |
| 2008/0240628 | A1 | 10/2008 | Vanloocke et al. | |
| 2009/0188929 | A1 * | 7/2009 | Sims | A47G 19/2205 |
| | | | | 220/500 |
| 2013/0001233 | A1 | 1/2013 | Hylton | |
| 2016/0155356 | A1 | 6/2016 | Heyer et al. | |
| 2018/0327174 | A1 | 11/2018 | Daniels, Jr. et al. | |

\* cited by examiner

INTERACTIVE MULTI-CHAMBER CONTAINER

CROSS REFERENCE TO RELATED APPLICATIONS

This application claims the benefit of U.S. Provisional Application No. 62/833,160 filed on Apr. 12, 2019. The above identified patent application is herein incorporated by reference in its entirety to provide continuity of disclosure.

BACKGROUND

Many individuals, such as children, enjoy juice boxes or single-serving snack packages. These individuals, however, may not enjoy various school-related activities, such as homework or studying. Typically, younger individuals may not have a developed appreciation for their academic development or education. It is generally known that students who study will perform better than students who choose not to study. It is also generally known that students will retain information more easily if they are interested in the information. Many teachers and parents have tried to develop innovative and interesting ways to capture the attention of students and children, however, many methods are time-intensive or are simply ineffective.

Therefore, there is a defined need amongst the known art for a device that will stimulate students and children in a manner that will entice them to be more interested in learning. The device should utilize a system that provides a reward for a student that is able to correctly identify an answer to a question.

SUMMARY

In view of the foregoing disadvantages inherent in the known types of containers now present in the prior art, the present invention provides a multi-chamber container wherein the same can be utilized for providing convenience for the user when containing liquid and food materials.

The present invention provides a multi-chamber container. More specifically, the present invention provides a system with which a user can engage in a knowledge-testing activity while eating food or consuming liquids.

An exemplary embodiment container of the invention comprises a housing. The housing defines a bottom wall with a sidewall that extends upwardly from the bottom wall. The housing additionally includes a top wall opposite the bottom wall, such that the housing is a self-contained unit. A plurality of chambers are internally defined in the housing. The plurality of chambers includes a primary chamber and at least one secondary chamber. The primary chamber includes a primary opening, such that the primary chamber can be accessed by a user via the primary opening. Each secondary chamber individually includes a secondary opening, such that each secondary chamber can be individually accessed by a user via the specific secondary opening. As such, the user can access each chamber of the plurality of the chambers from the outside of the housing.

A particular enhancement of the invention is the incorporation of an educational function into the container. A user is presented with a question, either displayed on the container or on a tag or packaging thereof, or on a mobile device. The user is also provided with multiple answers displayed in like manner as the question. The answers have indicia associated with each answer, such as A, B, C, D and the primary and secondary openings on the top wall have the same corresponding indicia A, B, C, D displayed adjacent to or on each opening. The indicia for the correct answer will be displayed adjacent to or on the primary opening while the incorrect answers will be displayed adjacent to, or on the secondary openings. Depending on the questions, the correct answer could be any of answer choices A, B, C, or D and the correct answer choice corresponds to the primary opening.

The primary and secondary openings are indistinguishable by a user from an outside of the container. If the user picks the correct answer and opens the opening associated with the same indicia as his or her answer, the user will be opening the primary opening and will gain access to the contents of the primary chamber. If the user selects an incorrect answer and opens the opening on the top wall of the container having the same indicia as his or her answer, the user will open the secondary opening and will access the secondary chamber. According to the exemplary embodiment, the primary chamber holds the desired contents of the container while the secondary chamber is empty, or contains a secondary fluid or material.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION

Figure 1A:
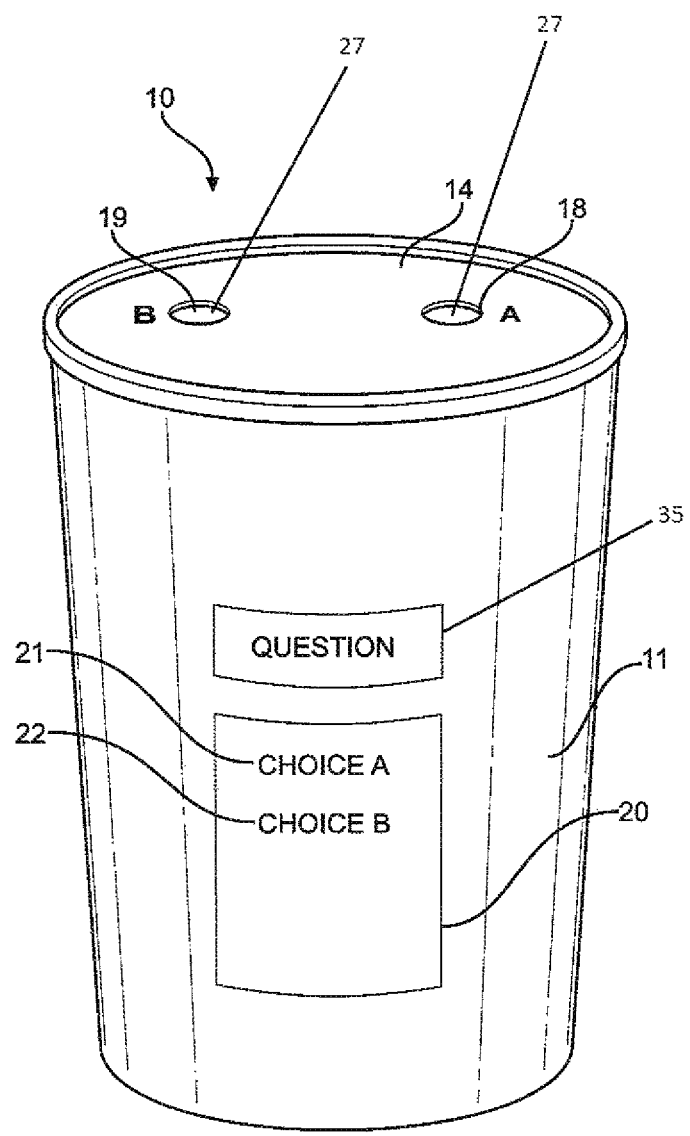
FIG. 1A shows a perspective view of an embodiment of the multi-chamber container.
Figure 1B:
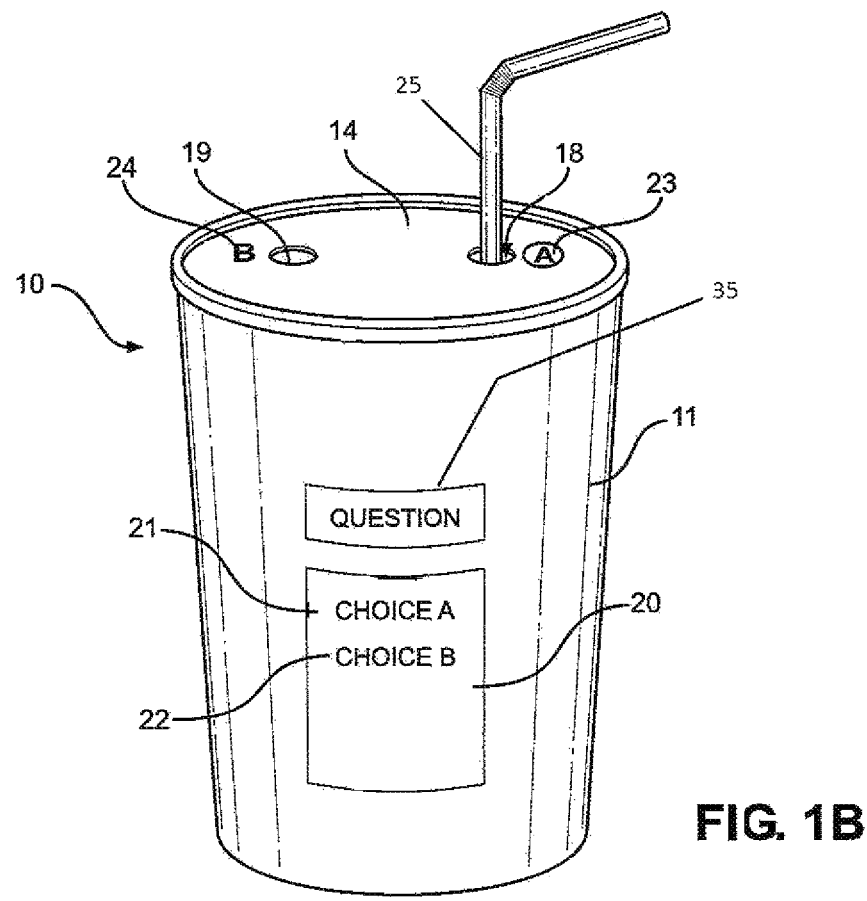
FIG. 1B shows a demonstrative perspective view of the multi-chamber container of FIG. 1A.

Reference is made herein to the attached drawings. Like reference numerals are used throughout the drawings to depict like or similar elements of the multi-chamber container. The figures are intended for representative purposes only and should not be considered to be limiting in any respect.

Referring now to FIGS. 1A-1D, there are shown a perspective view of an embodiment of the multi-chamber container, a demonstrative view of an embodiment of the multi-chamber container, an internal view of an embodiment of the multi-chamber container, and a perspective view of the alternate embodiment of the multi-chamber container, respectively. The multi-chamber container 10 comprises a housing 11. The housing 11 is defined by a bottom wall 12 with a sidewall 13 extending upward therefrom (the bottom wall 12 and the sidewall 13 being illustrated in FIG. 1C). The housing 11 comprises a top wall 14. In the illustrated embodiment, the sidewall is circular in cross-section, such that a cylindrical housing is formed.

Figure 1C:
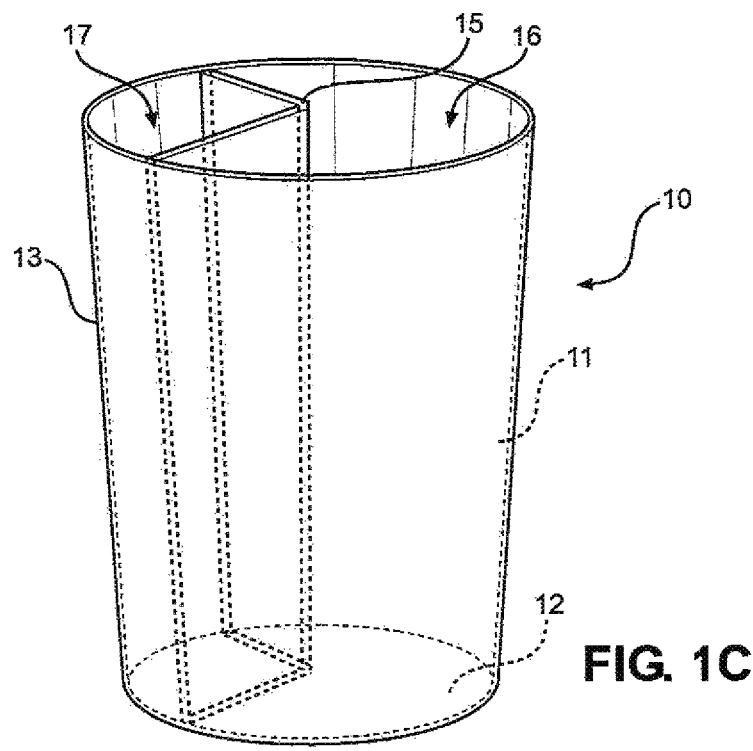
FIG. 1C shows an internal perspective view of a portion of the multi-chamber container of FIG. 1A.
Figure 1D:
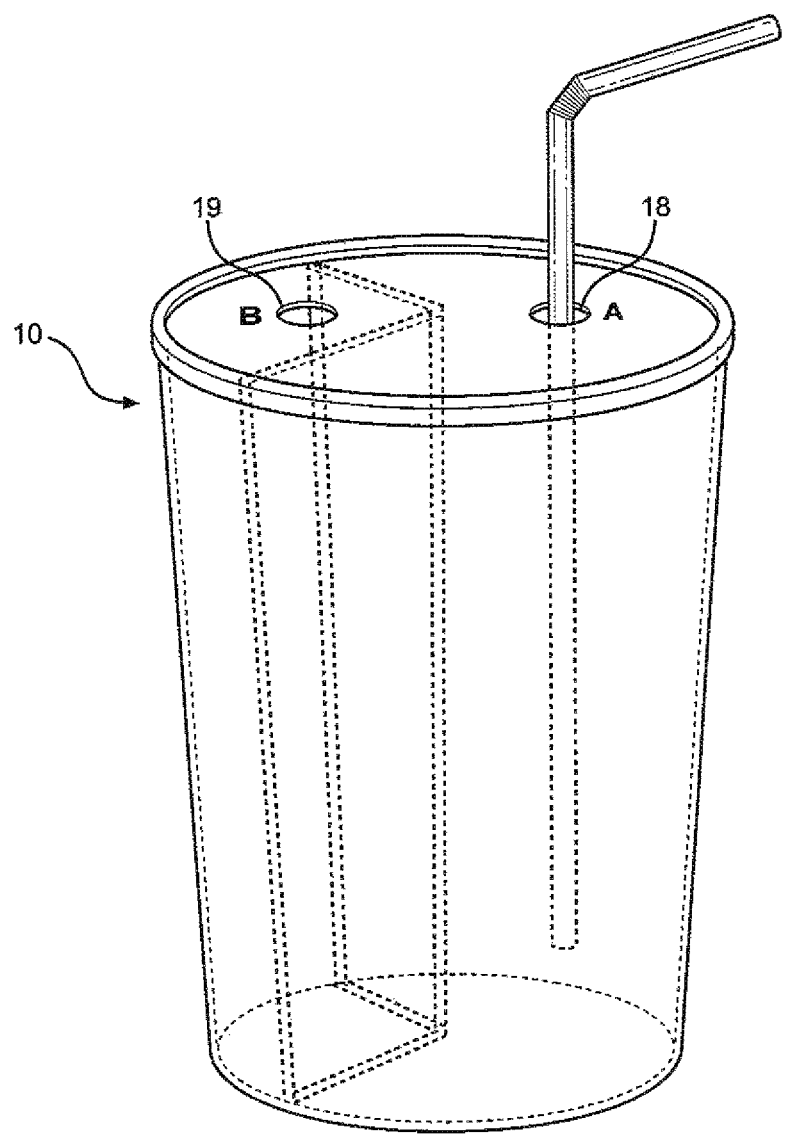
FIG. 1D shows a perspective view of the multi-chamber container of FIG. 1A with internal portions shown dashed.

As shown in FIG. 1C, the housing 11 defines a plurality of chambers via a plurality of chamber walls 15. The plurality of chambers consists of a primary chamber 16 and at least one secondary chamber 17. In the illustrated embodiment, the plurality of chambers consists of a primary chamber 16 and a singular secondary chamber 17.

In alternate embodiments, however, the plurality of chambers comprises any number of secondary chambers. In the illustrated embodiment, the plurality of chamber walls 15 forms a primary chamber 16 that is larger than the singular secondary chamber 17. As such, a greater volume is provided to the primary chamber 16.

The multi-chamber container 10 further comprises a primary opening 18. The primary opening 18 is disposed on the top wall 14 of the housing 11. The primary opening 18 provides access to the primary chamber 16. Furthermore, the housing 11 provides at least one secondary opening 19. In the illustrated embodiment, the housing 11 comprises a single secondary opening 19. Each secondary opening 19 provides access to the secondary chamber 17 corresponding to the specific secondary opening 19.

In this regard, the term opening encompasses a designated position to be opened, even though as sold the opening is closed or sealed to avoid spillage.

In some embodiments, the housing 11 further comprises a display 20 on an external surface thereof. As shown, the display 20 comprises at least a primary indicia 21 and at least one secondary indicia 22. As specifically shown in FIG. 1B, the primary indicia 21 may correspond to a primary identifier 23 in a proximate position to the primary opening 18. In the illustrated embodiment, the primary indicia "A" corresponds to the primary identifier 23 ("A"). For example, if a question 35 is displayed as "Which of these animals Is a mammal?" and the "choice A" displays the word "dog" and the "choice B" displays the word "alligator," the correct answer, choice A, would be associated with the primary opening 18. In this regard the word "Question" in the drawings would actually display the question and the words "Choice" would actually display answers.

Additionally, each secondary indicia 22 may correspond to a secondary identifier 24 placed in a proximate position to the secondary opening 19.

The display 20 may be of any suitable configuration, such that the user can be "quizzed" or "tested" in a variety of ways. The primary or secondary openings are not distinguishable by a user until one or more of the openings 18, 19 are opened. The user selects which opening to open based on a perceived correct answer to a question on the display. A correct answer corresponds to the primary opening and an incorrect answer corresponds to one or more secondary openings. Although the correct answer in the drawings is shown as "A", the correct answer could be "B" depending on the question. In that case the primary opening 18 would be associated with the B choice on the top wall.

Figure 2A:
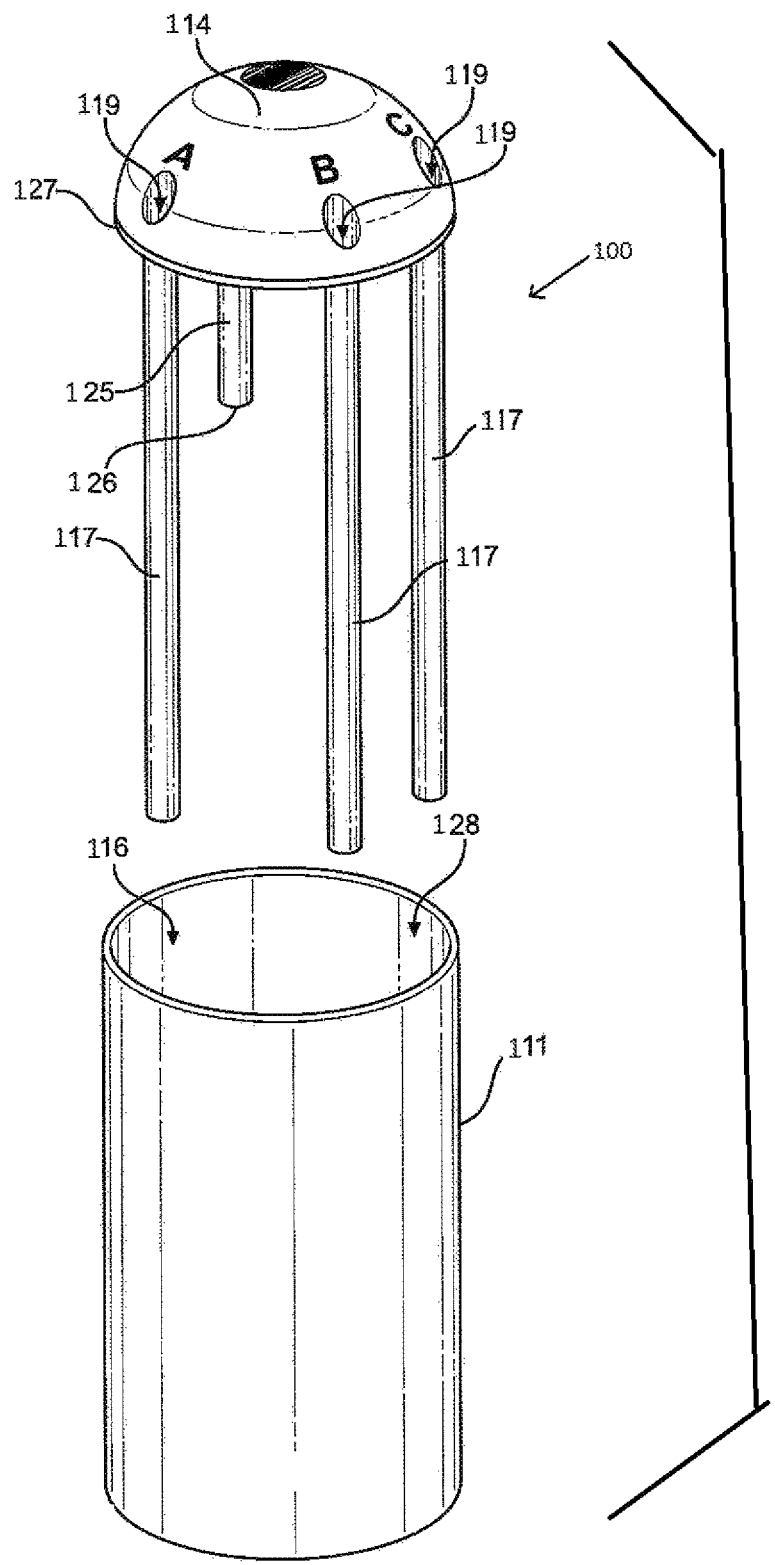
FIG. 2A shows an exploded perspective view of an alternate embodiment of the multi-chamber container.
Figure 2B:
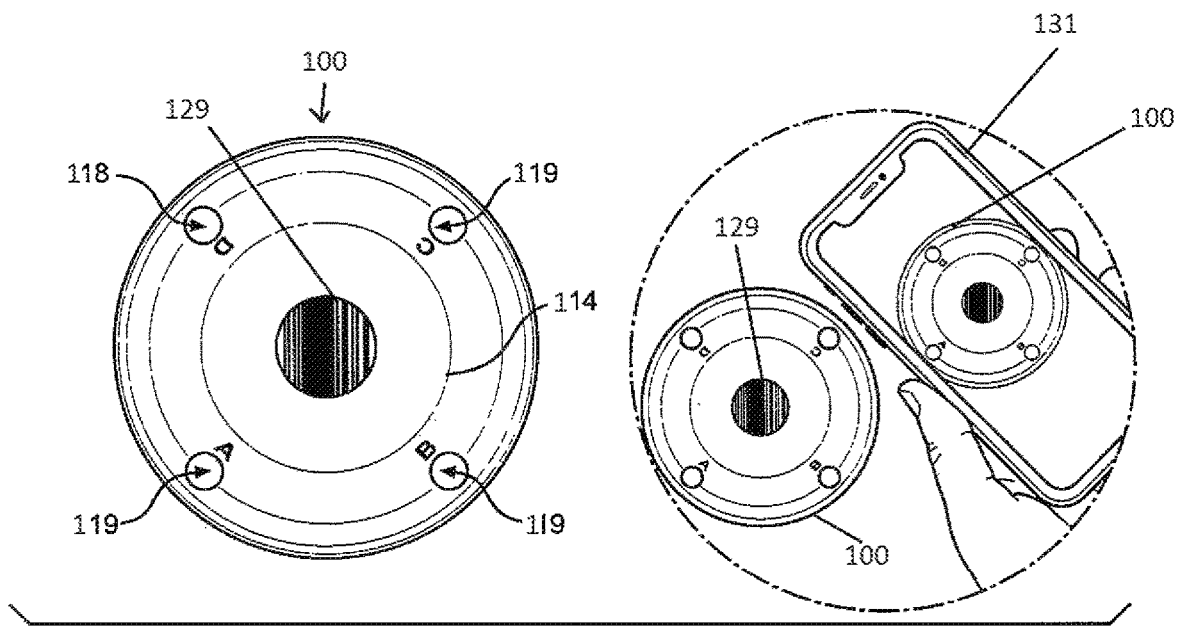
FIG. 2B shows a top view of the multi-chamber container of FIG. 2A and a smart phone screen Imaging the top view.
Figure 2C:
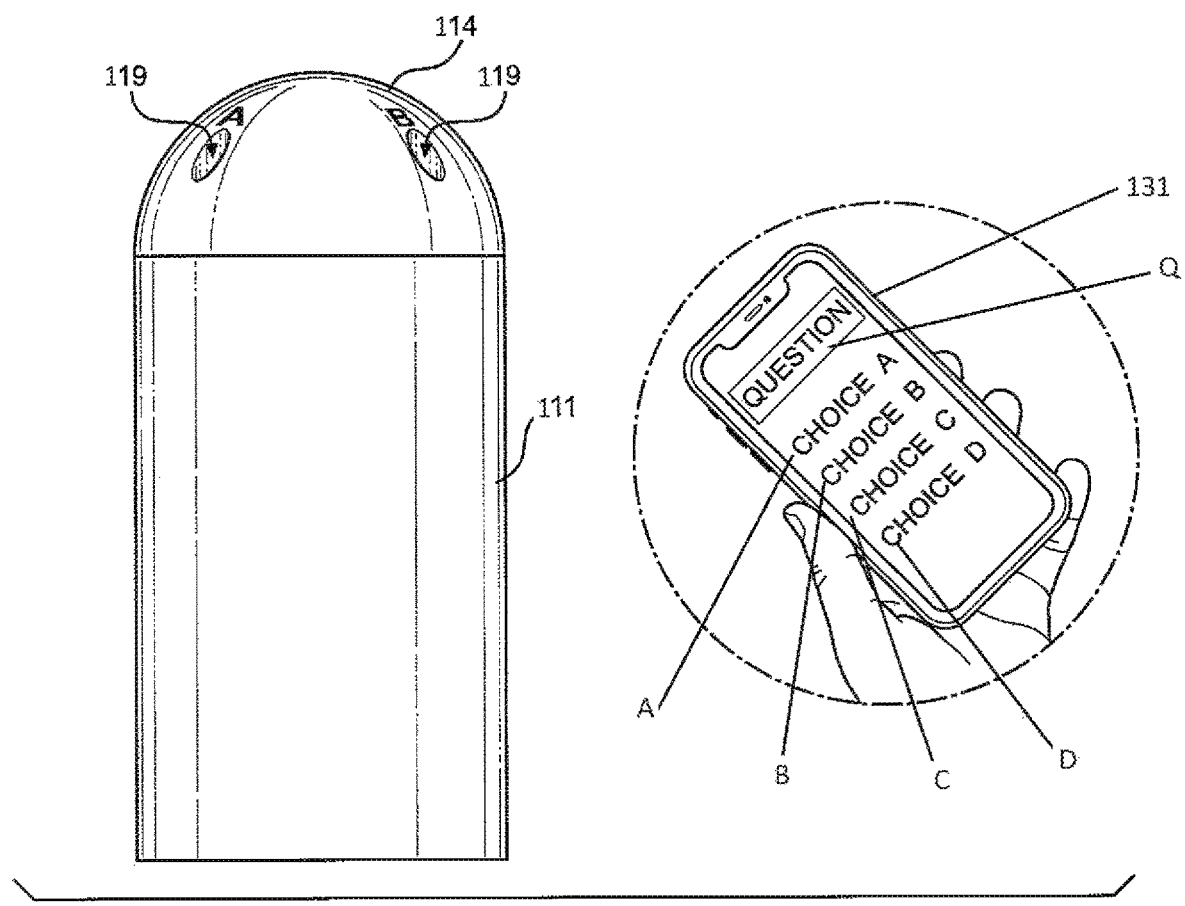
FIG. 2C shows a side view of the multi-chamber container of FIG. 2A and a smart phone screen displaying information in response to the multi-chamber container.
Figure 3A:
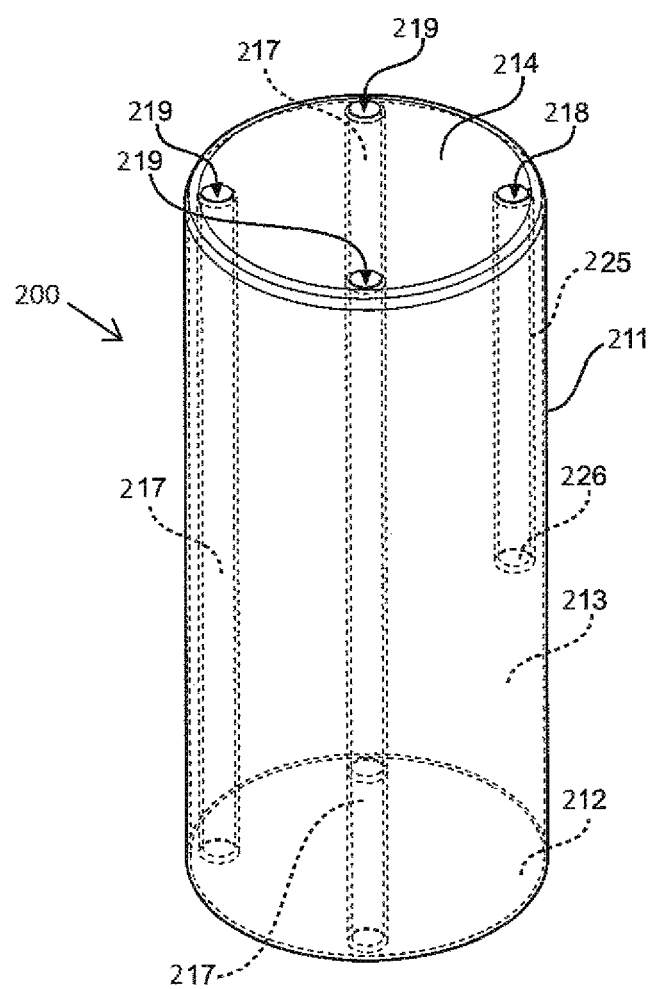
FIG. 3A shows a perspective view of an alternate embodiment of the multi-chamber container with internal portions shown dashed.
Figure 3C:
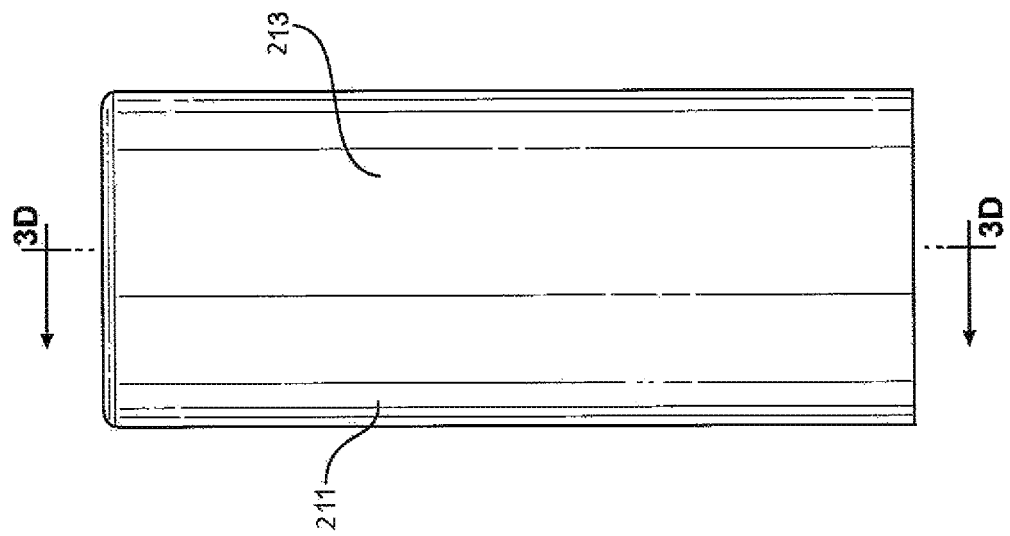
FIG. 3C shows a side view of the multi-chamber container of FIG. 3A.
Figure 3B:
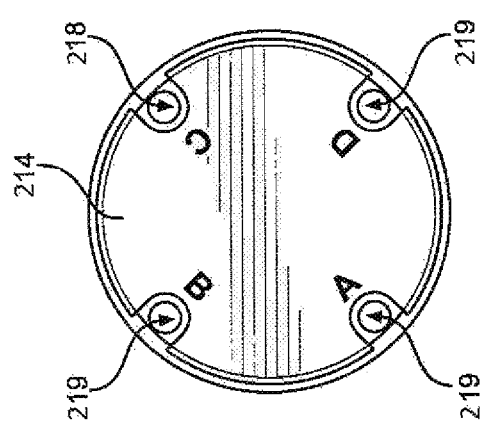
FIG. 3B shows a top view of the multi-chamber container of FIG. 3A.
Figure 3D:
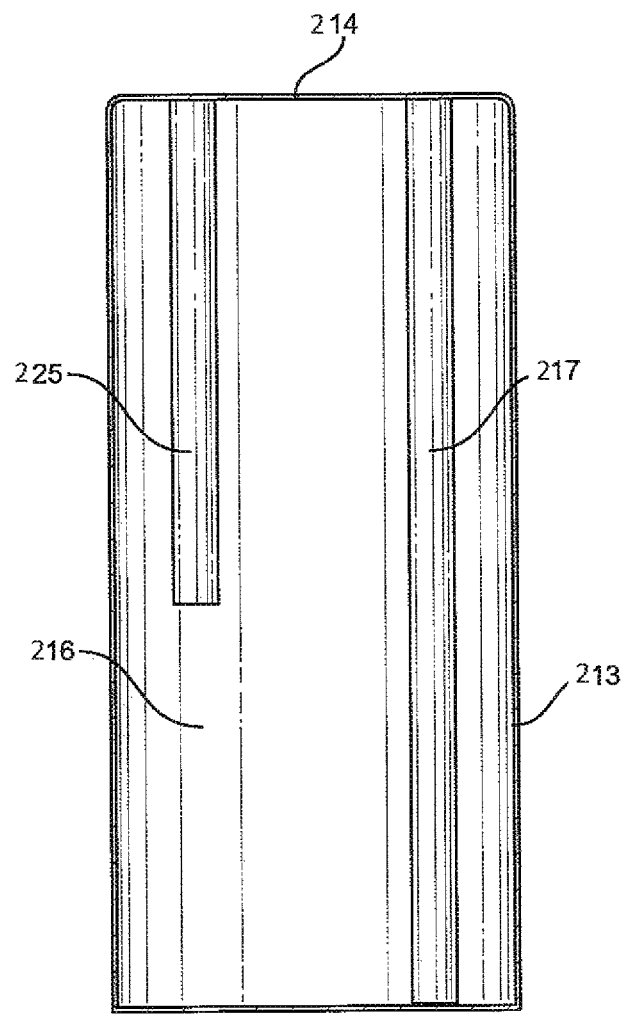
FIG. 3D shows a cross-sectional view of the multi-chamber container of FIG. 3A taken generally along line 3D-3D in FIG. 3C.

Referring now to FIGS. 2A-2C, there is shown an exploded view, a top view and a side view of an alternate embodiment of the multi-chamber container 100, respectively. In the illustrated embodiment, a top wall 114 is fused, or otherwise sealingly attached, with the plurality of secondary chambers 117 and a sleeve 125 corresponding to a primary chamber. The sleeve 125 comprises a bottom opening 126 and extends downward into a primary chamber 118 which is defined by a housing 111 having a bottom wall and side wall as described in FIGS. 1A-1D. The sleeve 125 comprises the bottom opening 126, such that a straw can be placed therein and can access the housing 111. In the illustrated embodiment, a plurality of secondary openings 119 are each of an identical perimeter to a primary opening 118. The openings 118, 119 can be sealed by the top wall or by a membrane until punctured by a straw. As such, an item, such as a straw, can be inserted into each secondary opening 119 and primary opening 118 in the same manner. When the straw, or other item, is inserted into the secondary opening 119, it will not have access to the primary chamber 116, where presumably the contents would be stored. The secondary chamber 117 are closed at bottoms thereof to be closed to the primary chamber 116.

An inner ring 127 extends downward from the top wall 114 and is of a smaller perimeter than the bottom perimeter of the top wall 114. The inner ring 127 is, additionally, of a smaller perimeter than the top of the open upper end 128 of the housing 111, such that when the top wall 114 is engaged with the housing 111, a seal is formed. Additionally, in the illustrated embodiment, the perimeter of the top wall 114 is of an identical size to the perimeter of the open upper end 128 of the housing 111. As such, the surface of the multi-chamber container is entirely smooth when the top wall 114 is engaged with the housing 111 and the ring 127 fits tightly into the upper end 128.

As demonstrated in FIGS. 2B and 2C, in some embodiment, the display, such as the display 20 shown in FIG. 1A is replaced with a bar code 129. The bar code is configured to be scanned by a mobile device 131, such as a smart phone (as shown in FIG. 2B), such that a question Q and answer choices A, B, C and D will be displayed upon the mobile device (as shown in FIG. 2C). The bar code may be of any suitable configuration to be scanned by a device, such as a traditional bar code, a QR code, or any similar representation. The multiple answers have an indicia, such as A, B, C, D which correspond to the selectable openings marked A, B, C, D on the top wall 114. For example, if the correct answer is "B," the indicia "B" on the top wall 114 corresponds to the primary opening 118.

Referring now to FIGS. 3A-3D, there is shown an internal view, a top view, a side view and a cross-sectional view of an embodiment of the multi-chamber container 200, respectively. In the illustrated embodiment, a top wall 214 of a housing 211 is fused or otherwise sealingly attached with a sidewall 213 of the housing 211, such that the top wall 214 is not removable from the housing 211. The housing 211 includes a side wall 213 and a bottom wall 212 as described in FIGS. 1A-1D with regard to the sidewall 13 and the bottom wall 12.

In the illustrated embodiment, the junction of the top wall 214 and the sidewall 213 is rounded. The illustrated embodiment provides a plurality of secondary chambers 217 that are fused to the underside of the top wall 214 of the housing 211 and extend downward from the plurality of secondary openings 219.

A primary opening 218 comprises a sleeve 225 extending downward therefrom. The sleeve 225 comprises a bottom opening 226. The bottom opening 226 allows for access to a primary chamber 216 defined by the housing 211. In the illustrated embodiment, the sleeve 225 extends downward at a lesser distance than each secondary chamber 217. Furthermore, in the illustrated embodiment, the plurality of secondary chambers 217 extend partially from the top wall 214 of the housing, terminating before contacting the bottom wall 212 of the housing 211. The housing can have a display with a question and answers having indicia A, B, C, D that are like the display 20 shown in FIGS. 1A-1D or a barcode and mobile device display as described in FIGS. 2B and 2C. The secondary chambers 217 have closed bottoms to be closed to the primary chamber 216.

Figure 4B:
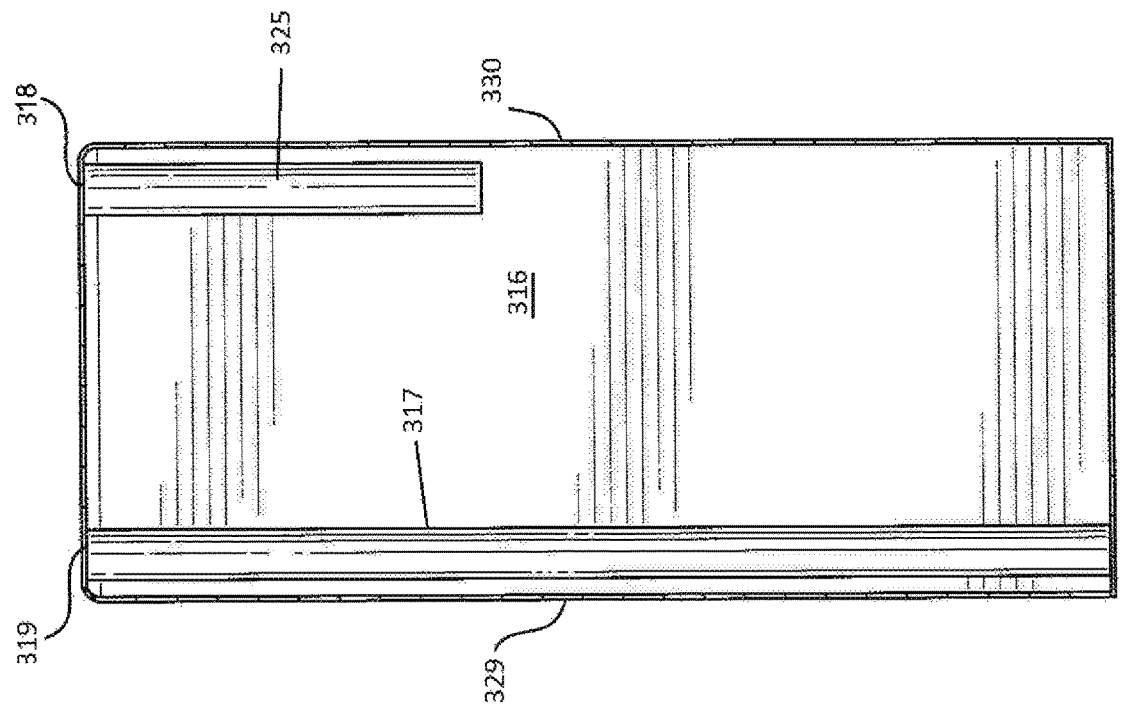
FIG. 4B shows a cross-sectional view of the multi-chamber container of FIG. 4A taken generally as indicated in section 4B-4B in FIG. 4A.
Figure 4A:
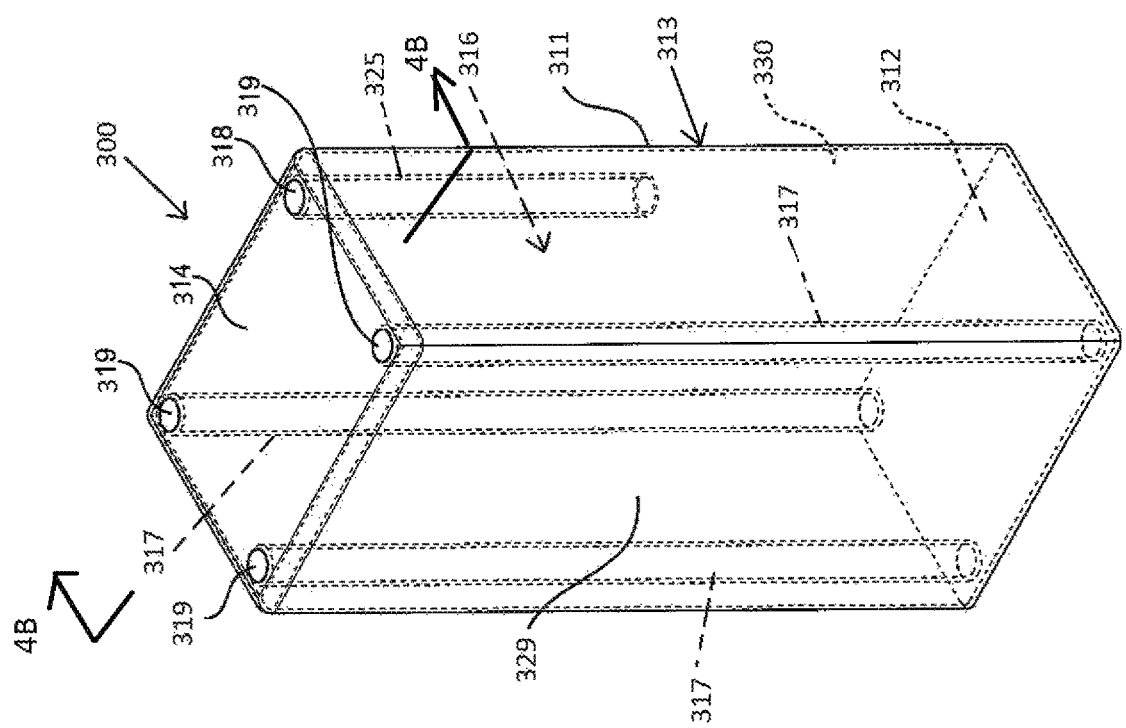
FIG. 4A shows a perspective view of an alternate embodiment of the multi-chamber container with internal portions shown dashed.
Figure 4C:
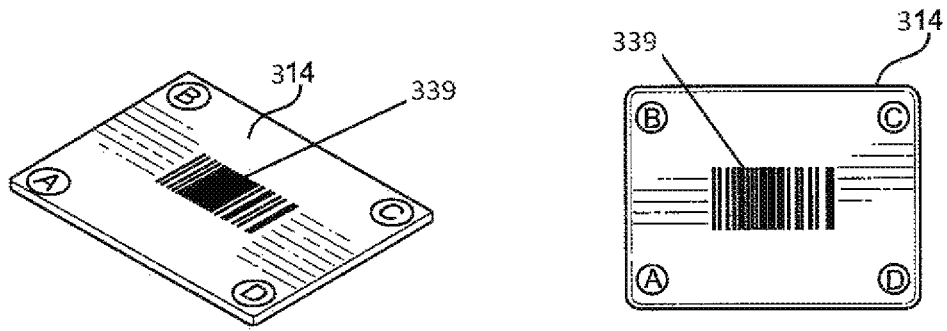
FIG. 4C shows a top view of the multi-chamber container of FIG. 4A.
Figure 4D:
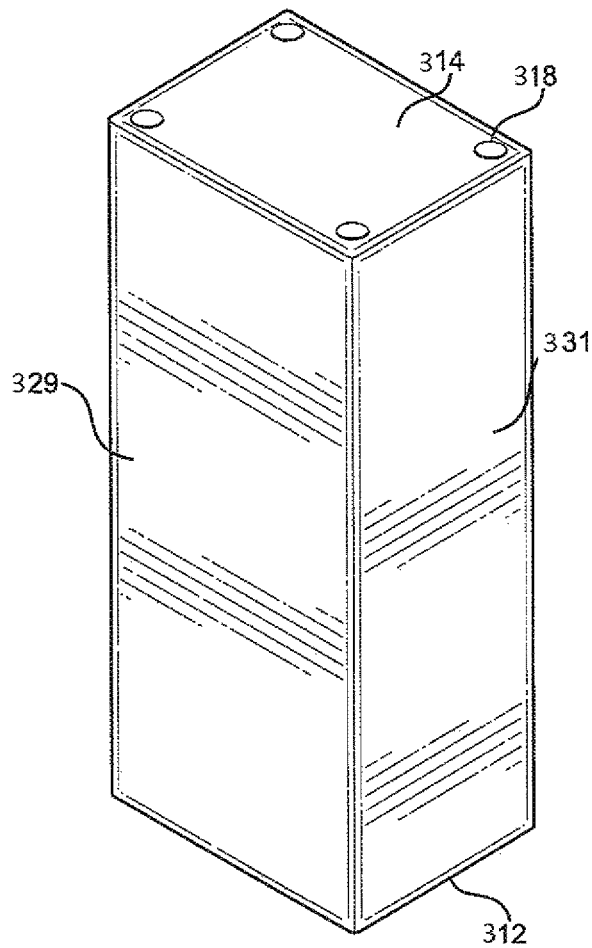
FIG. 4D shows an exploded perspective view of the multi-chamber container of FIG. 4A.
Figure 4E:
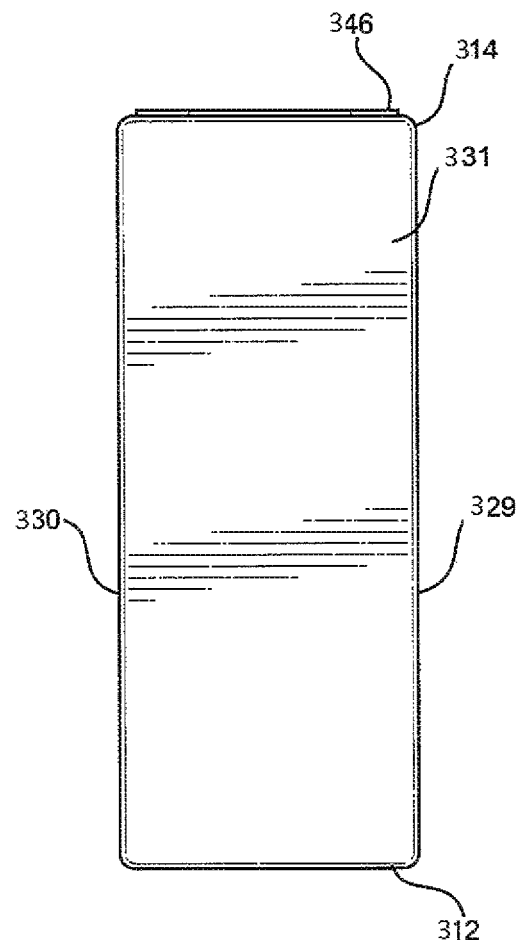
FIG. 4E shows a side view of the multi-chamber container of FIG. 4A.

Referring now to FIGS. 4A-4E, there is shown an internal view, a top view, a front view, a side view and a cross-sectional view of an embodiment of the multi-chamber container 300, respectively. In the illustrated embodiment, a housing 311 comprises a bottom wall 312 disposed oppositely a top wall 314 with a front wall 329 disposed oppositely a back wall 330 and a pair of opposing sidewalls 331. The housing 311 defines a primary chamber 316. In the illustrated embodiment, as shown in FIGS. 4C and 4D, the front wall 329 and the back wall 330 are of a greater length than the pair of sidewalls 331. As such, the top wall 314, a bottom wall 312, the sidewalls 331, the front and back walls 329, 330 and the horizontal cross-section of the illustrated embodiment are rectangular.

The embodiment comprises a primary opening 318 and three secondary openings 319. The housing 311, being an elongated cuboid shape, includes the primary opening 318 and each of the three secondary openings 319 in the corners of the top wall 314 of the housing. As such, the primary opening 318 and the three secondary openings 319 are evenly distributed among the top wall 314 of the housing 311. In alternate embodiments, the primary opening 318 and the secondary openings 319 are distributed upon the top wall 314 of the housing 311 in an alternate manner, e.g., arranged in a line.

The secondary chambers 317 are the same as the secondary chambers 217 in FIGS. 3A-3D and primary chamber 325 is the same as the primary chamber 225 in FIGS. 3A-3D. FIG. 4D illustrates the top wall 314 has a bar code 339. The bar code 339 is similar to the bar code 129 described in FIGS. 2B and 2C, and above in the specification, and functions in the same way. Alternatively, the housing 311 could have a display, like the display 20 in FIGS. 1A-1D, but with four answer choices, A, B, C and D. When an answer is selected, a straw is driven through a membrane that otherwise seals the openings 318, 319 or through the top wall at each opening.

Referring now to FIGS. 5A-5F, there is shown a front perspective view, a cross-sectional view, a front demonstrative view, a perspective demonstrative view, a first internal view and a second Internal view of an embodiment of the multi-chamber container 400. The housing 411 comprises a primary tab 433 that is in operable connection with the primary opening 418. In the illustrated embodiment, the primary tab 433 is in operable connection with the primary opening 418 via a pull tab 436. The pull tab 436 is attached to the primary tab 433, such that when a user removes the primary tab 433, the pull tab 436 opens the primary opening 418 providing access to the primary chamber 416. Alternatively, the pull tab 436 is not connected to the primary tab 433 and after being revealed by the separation of the primary tab 433, is pulled manually to open the primary opening 418.

In the illustrated embodiment, the display 420 comprises a primary indicia 421 and a plurality of secondary indicia 422. The display 420 further includes a prompt 435 proximally placed to the display 20. The prompt 435 comprises information that is designed to make the user "pick" or "choose" between the primary indicia 421 and the plurality of secondary indicia 422. In the specific embodiment, as annotated in FIG. 5C, the multi-chamber container comprises a prompt 435 that is a question with four answers—the primary indicia 421, a first secondary indicia 422 ("B"), a second secondary indicia 422 ("C") and a third secondary indicia 422 ("D"). As shown as an example, the primary indicia 421 corresponds to the correct answer (e.g. "Choice A") to the question of the prompt 435.

As such, when the user selects the tab corresponding to the correct answer (the primary tab 433) he or she is provided with access to the primary chamber 416, which contains a reward such as a liquid 437a such as a beverage, or a solid piece 437b such as a food product. The first secondary indicia B corresponds to a first secondary opening 441, the second secondary indicia C corresponds to a second secondary opening 442, and the third secondary indicia D corresponds to a third secondary opening 443. When the user engages the first secondary opening 441, the second secondary opening 442 or the third secondary opening 443, to tear off the tabs 434, they will not allow access to the primary chamber 416 and will furthermore not allow access to the reward 437a, 437b.

In the illustrated embodiment, the primary opening 418 is disposed on a corner section of the housing 411. The secondary chambers 417 are defined between the walls of the housing 411 and the plurality of secondary tabs 434, such that when the tabs 434 are removed, there is no opening under the tabs 434 into the primary chamber 416.

In some embodiments, such as the illustrated embodiment, the housing 411 is made of a flexible material. In other embodiments, the housing 411 is made of a rigid material. The housing 411 may be any suitable material, such that the contents thereof may be kept sanitary for safe human consumption. As demonstrated in FIGS. 5E and 5F, the housing 411 may be designed to hold a liquid substance 437a or a solid food substance 437b, such that the individual may be rewarded with a beverage or food item dispensed through the opening 418.

Figure 5A:
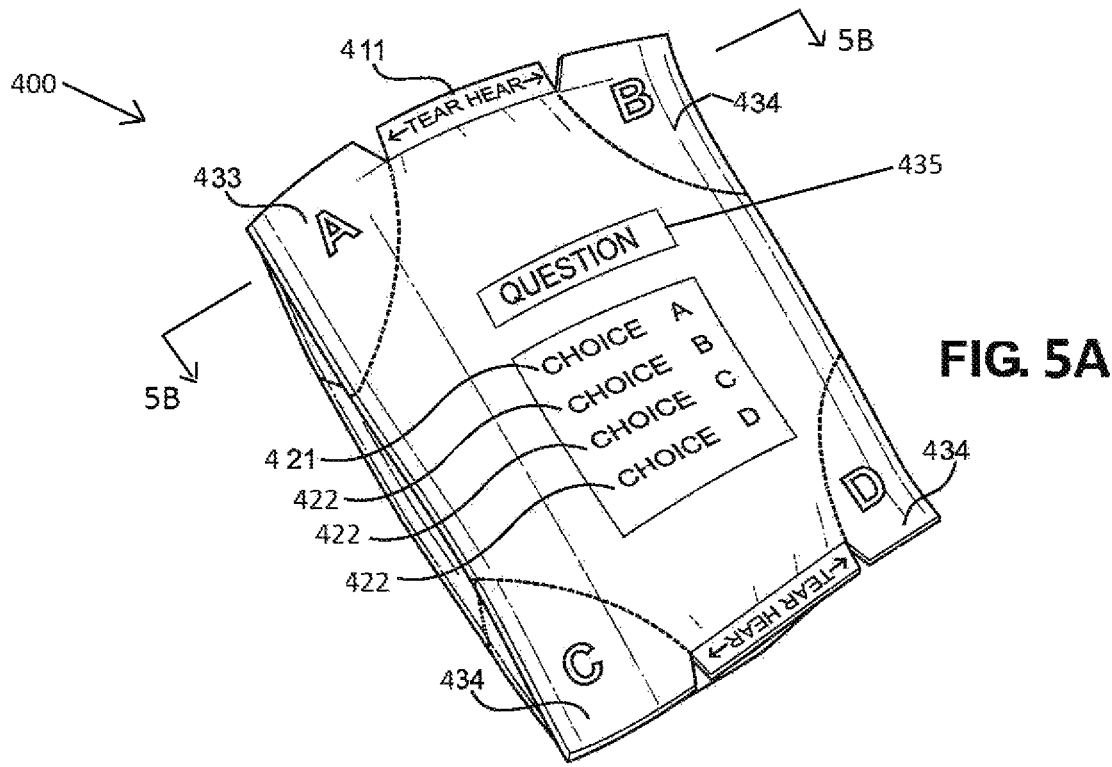
FIG. 5A shows a front perspective view of an alternate embodiment of the multi-chamber container.
Figure 5D:
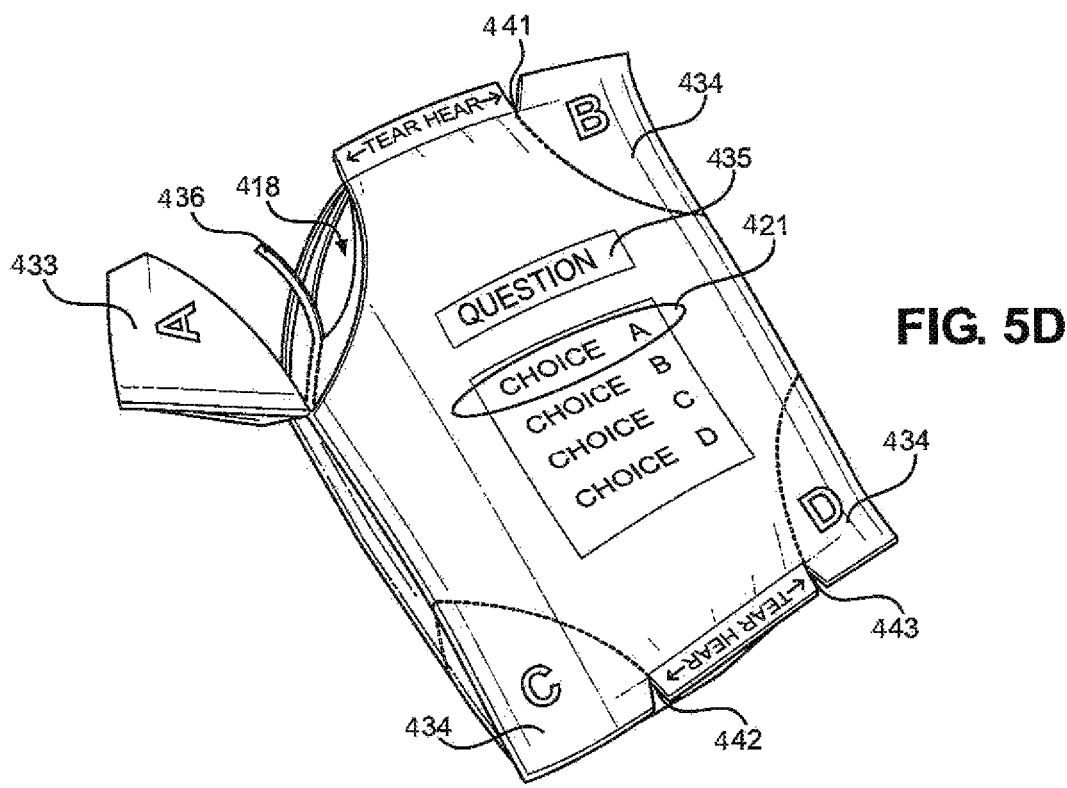
FIG. 5D shows a front perspective demonstrative view of the multi-chamber container of FIG. 5A with one portion partially separated and a portion beneath.
Figure 5B:
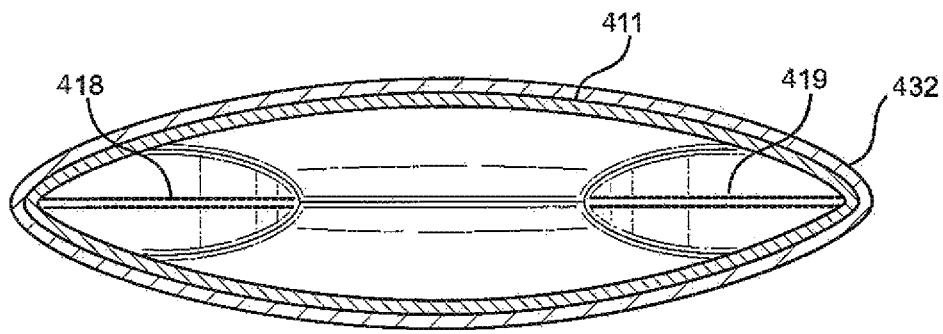
FIG. 5B shows a cross-sectional view of the multi-chamber container of FIG. 5A as indicated in section 5B-5B in FIG. 5A.
Figure 5C:
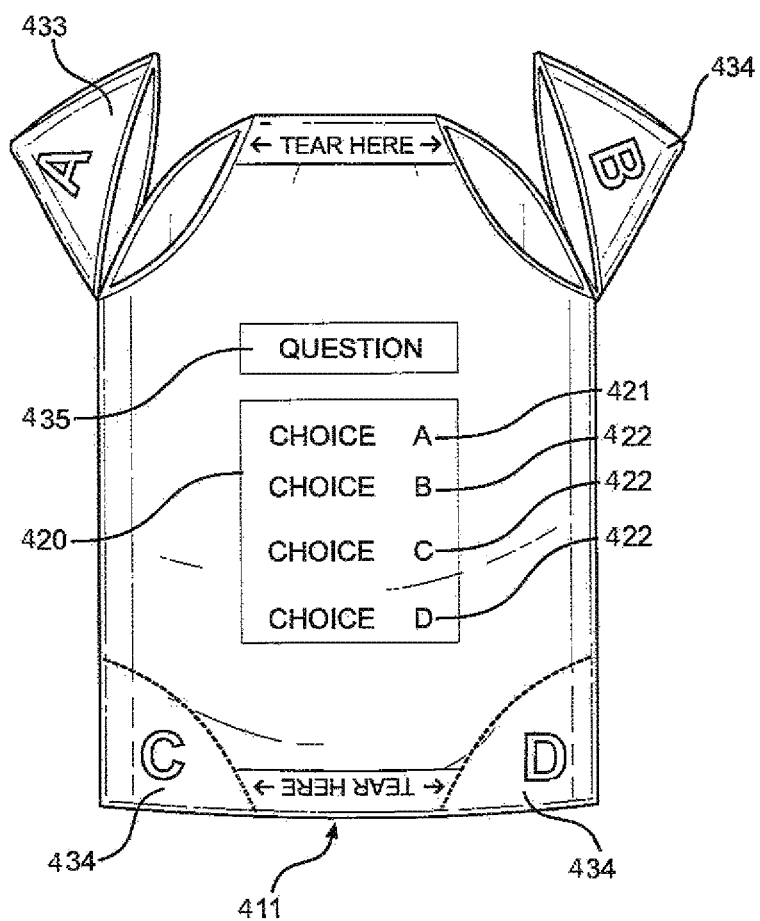
FIG. 5C shows a front demonstrative view of the multi-chamber container of FIG. 5A with portions partially separated.
Figure 5E:
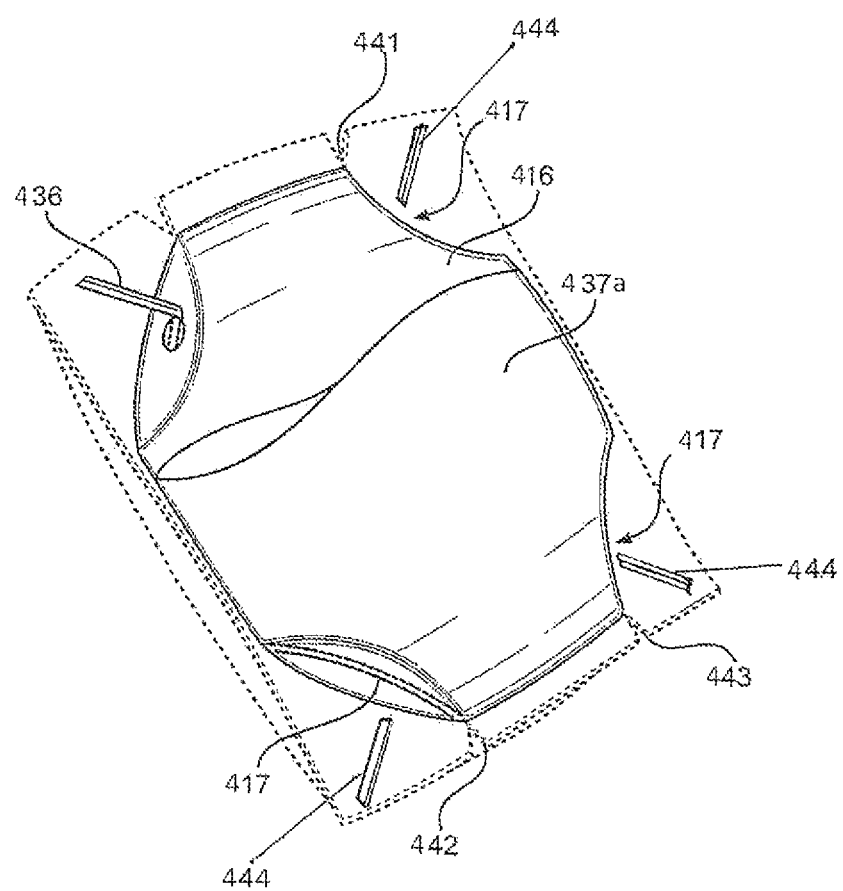
FIG. 5E shows an internal perspective view of the multi-chamber container of FIG. 5A holding a liquid.
Figure 5F:
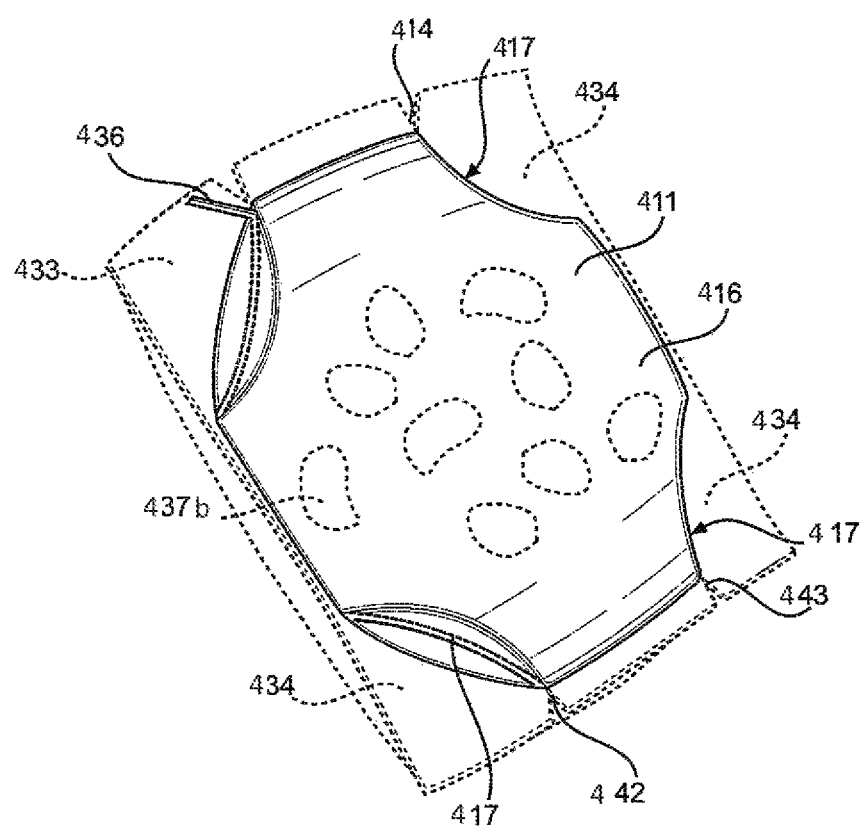
FIG. 5F shows an internal perspective view of the multi-chamber container of FIG. 5A holding solid pieces.
Figure 6B:
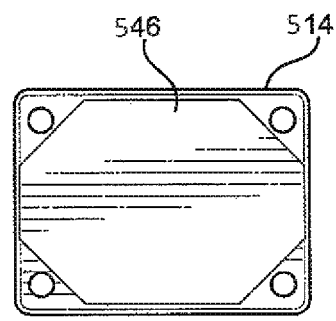
FIG. 6B shows a top view of the multi-chamber container of FIG. 6A.
Figure 6A:
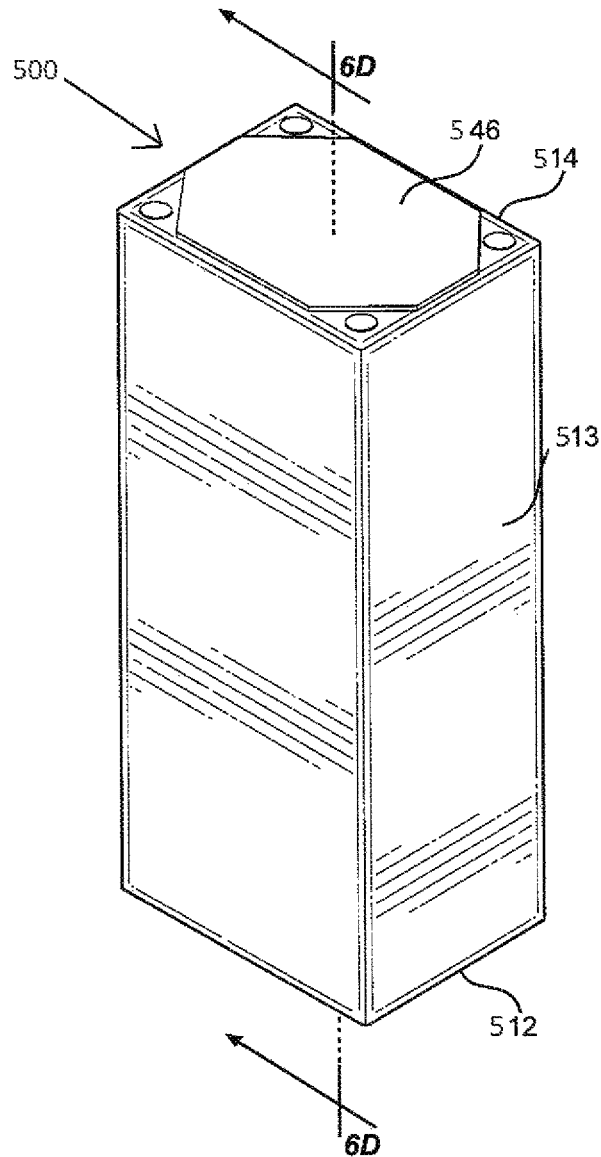
FIG. 6A shows a front perspective view of an alternate embodiment of the multi-chamber container.
Figure 6C:
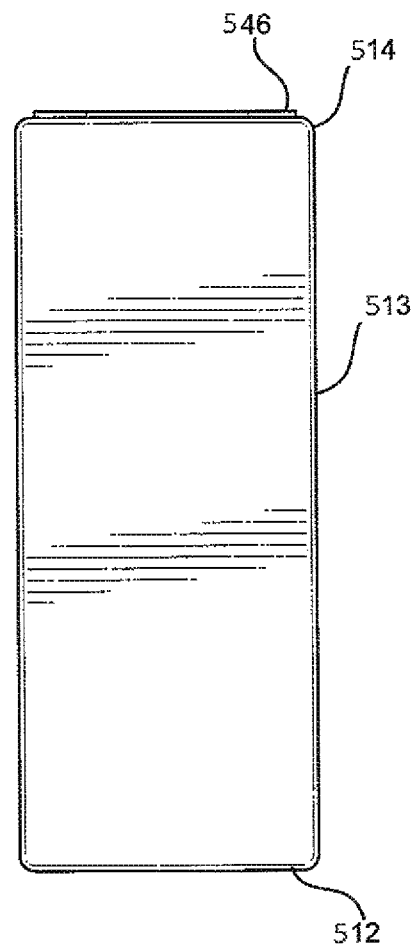
FIG. 6C shows a side view of the multi-chamber container of FIG. 6A.
Figure 6E:
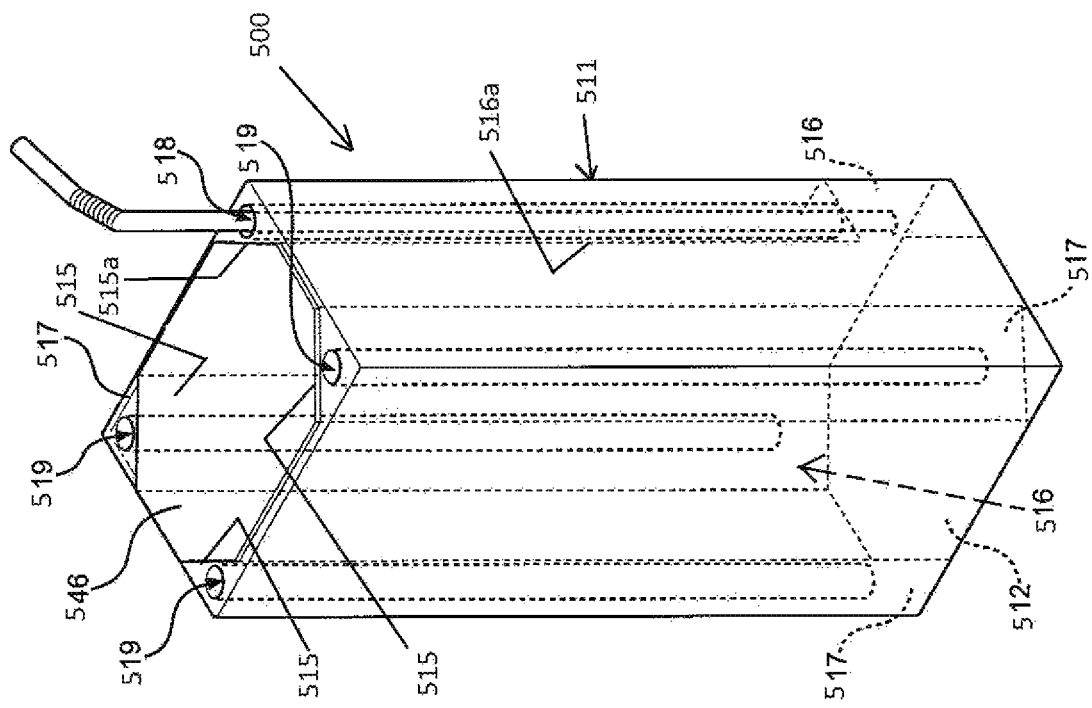
FIG. 6E shows the multi-chamber container of FIG. 6A with internal portions shown dashed.
Figure 6D:
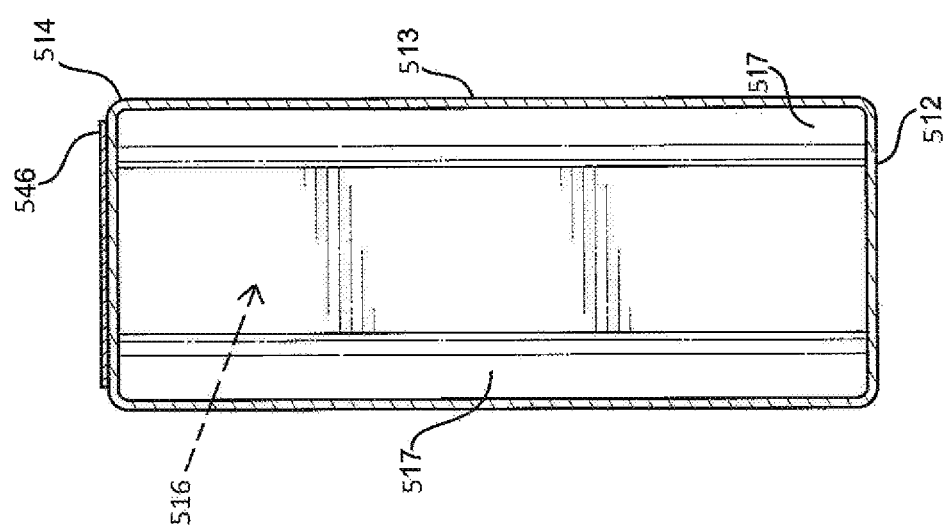
FIG. 6D shows a cross-sectional view of the multi-chamber container of FIG. 6A as indicated in section 6D-6D in FIG. 6A.

FIG. 5E also shows inoperable connections 444 or "dummy seals" are used in secondary tabs 434 to imitate primary tab 433 during the event of touching or squeezing the embodiment in an effort to identify primary opening. The operable connection joining the primary tab or primary seal and the primary opening remains concealed until primary tab or seal is separated.

Referring now to FIGS. 6A-6E, there is shown a perspective view, a top view, a side view, a cross-sectional view and an internal perspective view of an alternate embodiment of the multi-chamber container 500, respectively. In the illustrated embodiment, a top wall 514 of the housing comprises a reinforcement plate 546. The reinforcement plate 546 is configured to provide enhanced structural stability to the top wall 514 of the housing. In the illustrated embodiment, the top wall 514 of the housing is rectangular, such that a primary opening 518 and a plurality of secondary openings 519 are each disposed in a corner of the top wall 514 of the housing. In such an embodiment, the reinforcement plate 546 extends across the top wall 514 of the housing, aside from the corners of the top wall 514 of the housing, such that the primary opening 518 and the plurality of secondary openings 519 are accessible.

Furthermore, in the illustrated embodiment, the plurality of secondary chambers 517 are disposed in corresponding corners of the housing. Specifically, three secondary chambers 517 are defined in three corners via chamber walls 515 extending entirely from a bottom wall 512 to the top wall 514 of the housing. A primary chamber portion 516a is disposed in the fourth corner of the top wall 514 and is defined by a chamber wall 515a extending downward from the top wall 514 of the housing and terminating a distance above the bottom wall 512 of the housing. Extending a straw into the portion 516a gains access into the primary chamber portion 516a which is open into the rest of the primary chamber 516 defined by the housing 511. As such, by providing the wall 515a, the identity of the primary chamber 516 is more discrete from the outside of the housing, i.e., a user cannot easily squeeze the corners of the housing to detect the absence of a secondary chamber in one corner.

Figures 7A, 7B:
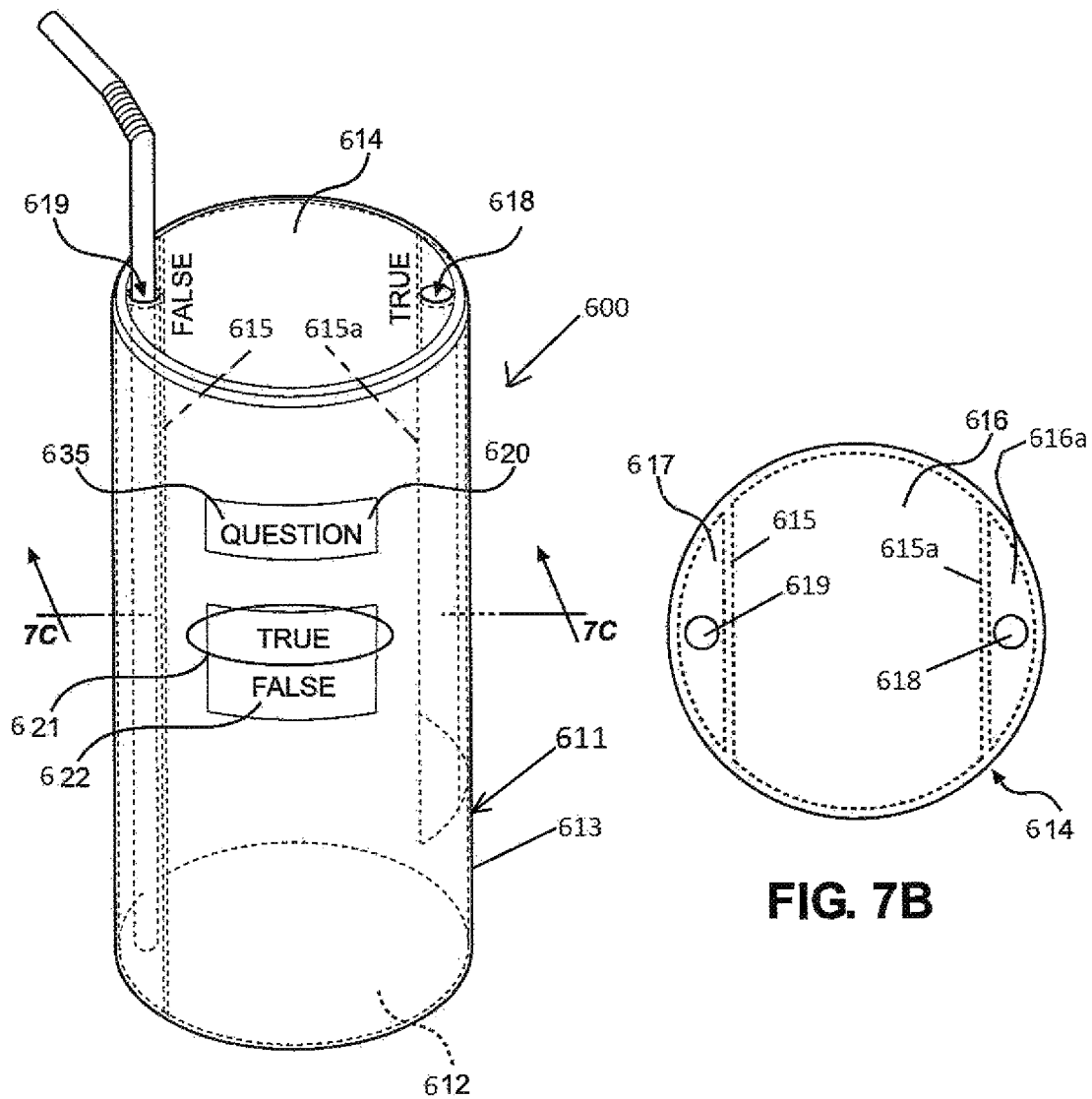
FIG. 7A shows a front perspective view of an alternate embodiment of the multi-chamber container with internal portions shown dashed.
FIG. 7B shows a top view of the multi-chamber container of FIG. 7A
Figure 7C:
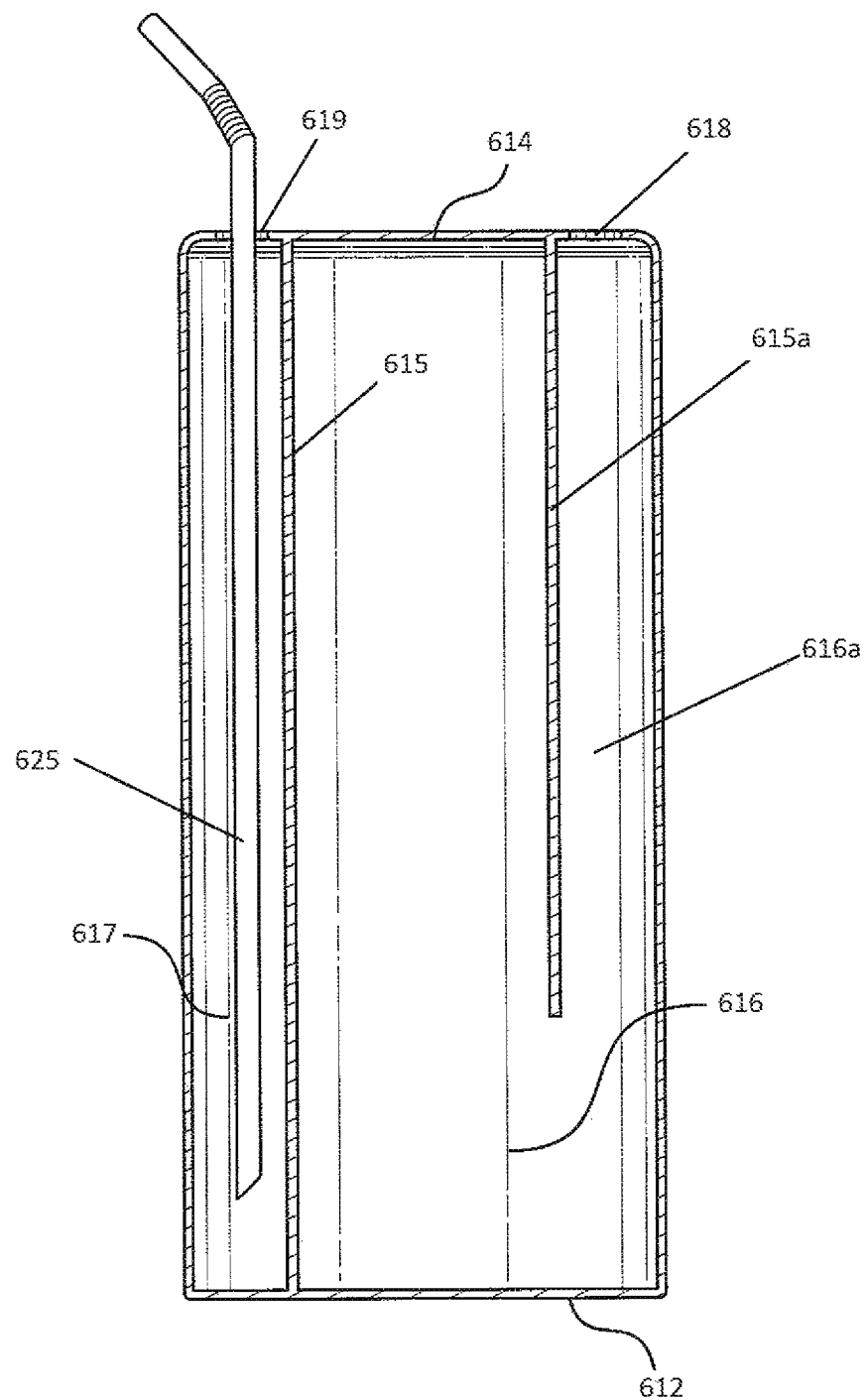
FIG. 7C shows a cross-sectional view of the multi-chamber container of FIG. 7A as indicated in section 7C-7C in FIG. 7A.
Figure 8A:
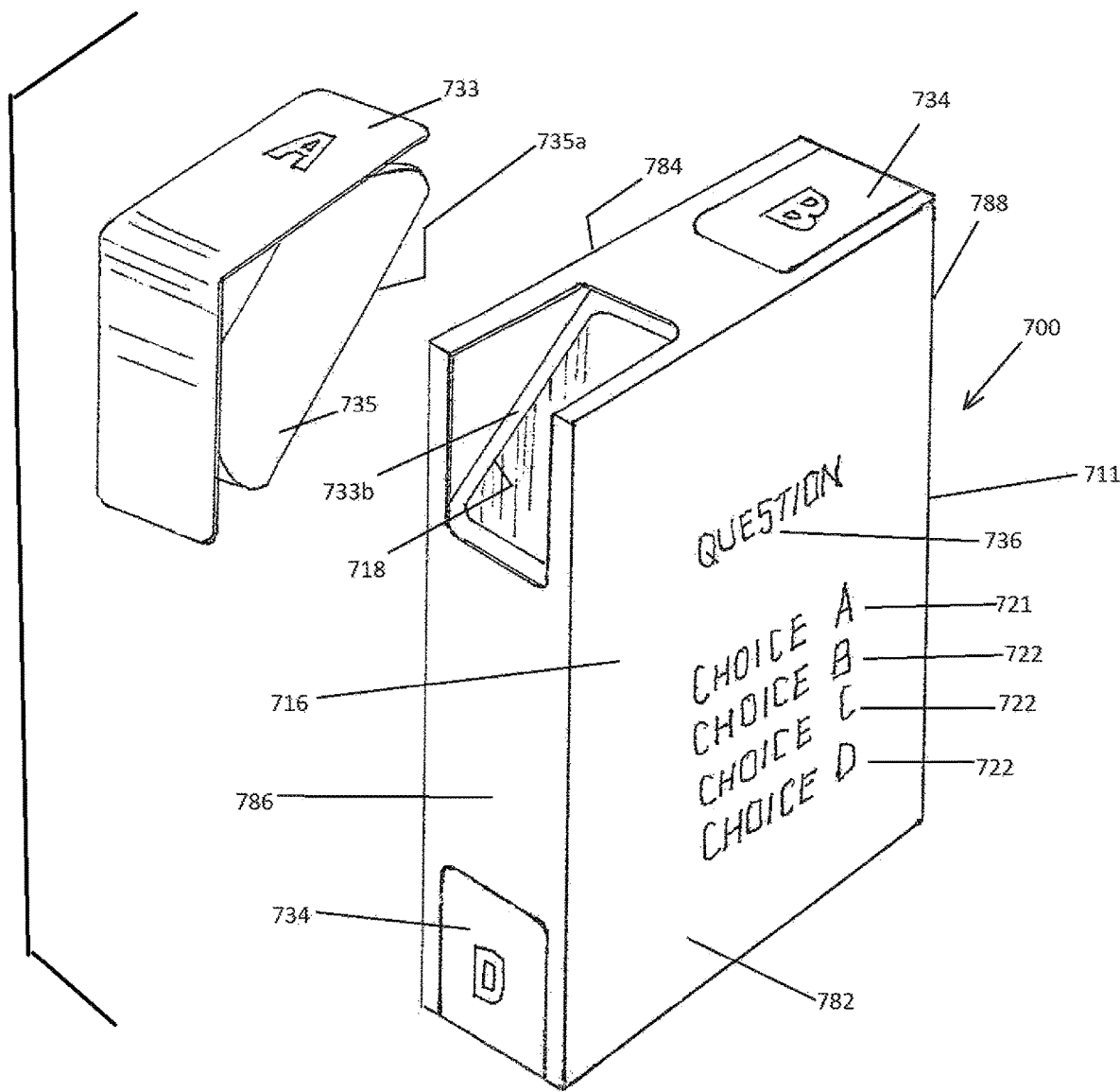
FIG. 8A shows an exploded perspective view of an alternate embodiment of the multi-chamber container.
Figure 8B:
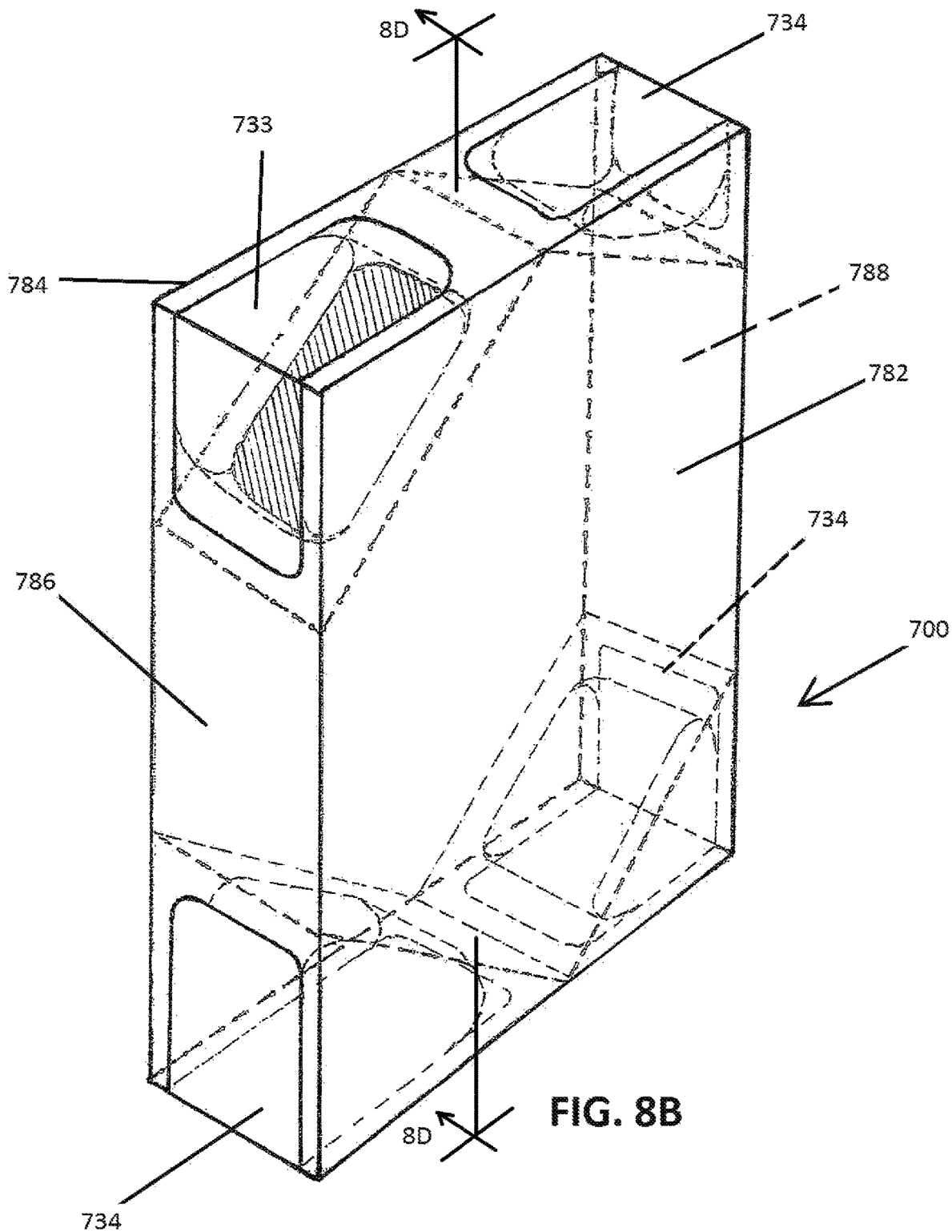
FIG. 8B shows a perspective view of the multi-chamber container of FIG. 8A with internal portions shown dashed.
Figure 8C:
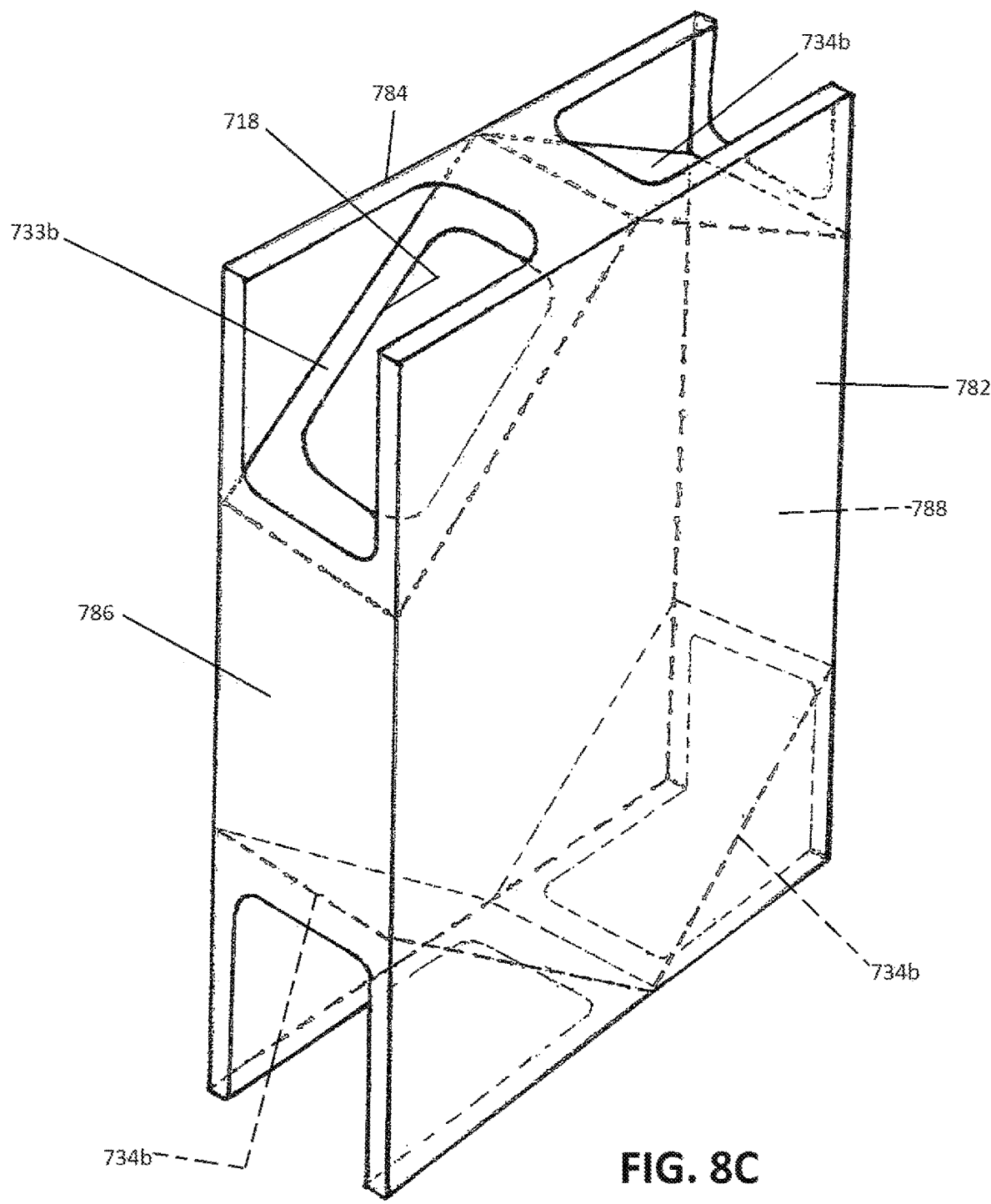
FIG. 8C shows a perspective view of the multi-chamber container of FIG. 8A with portions removed.
Figure 8D:
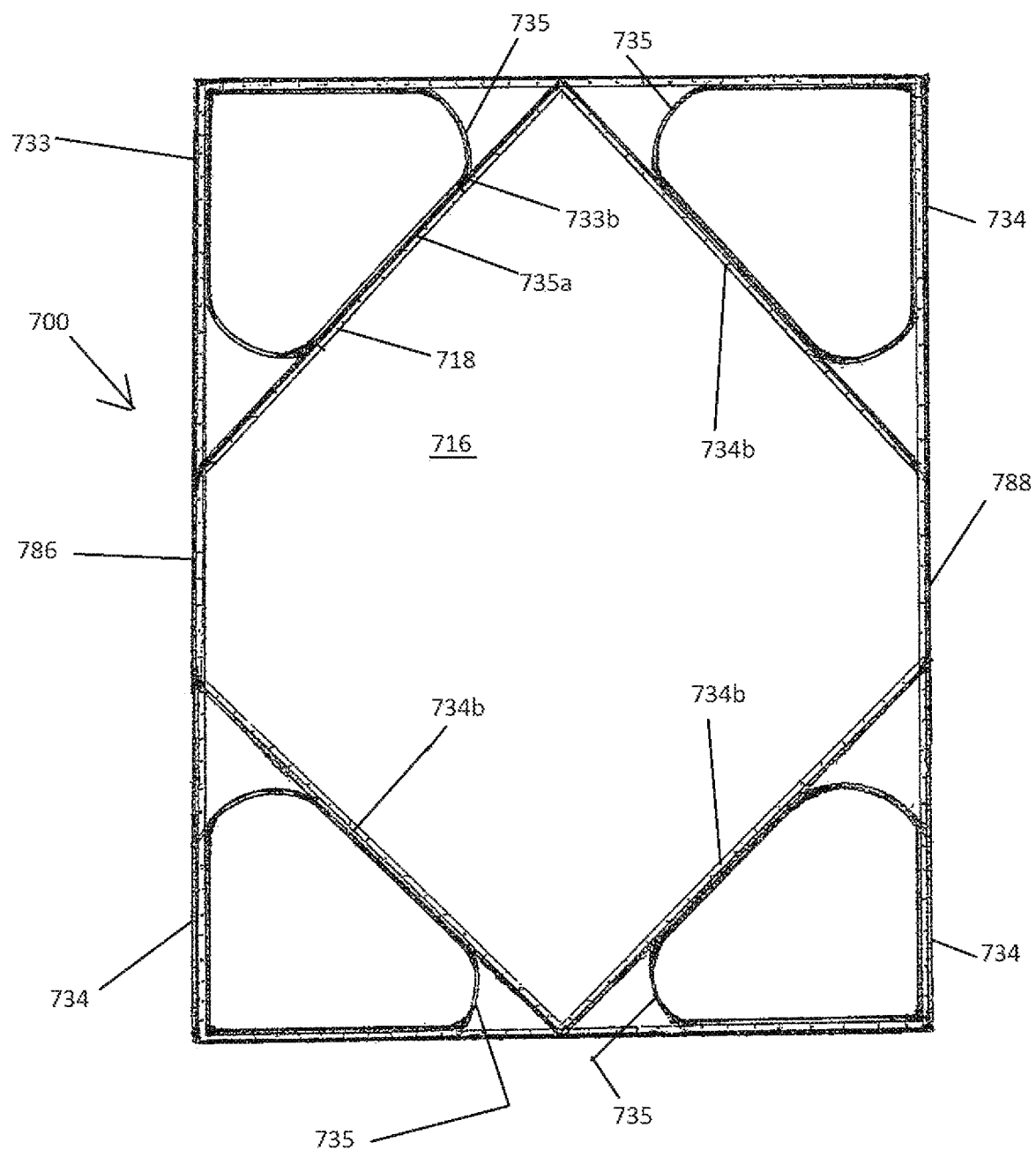
FIG. 8D shows a cross-sectional view of the multi-chamber container of FIG. 8A as indicated in section 8D-8D in FIG. 8B.

Referring now to FIGS. 7A-7C, there is shown an internal view, a top view and a cross-sectional view of an embodiment of the multi-chamber container 600. In the illustrated embodiment, the display 620 comprises a question 635 and a single primary indicia 621 and a single secondary indicia 622. Specifically, the primary indicia 621 reads TRUE and the secondary indicia 622 reads FALSE. As such, the user may read the prompt, which would be a statement in this embodiment, and select whether the statement in that prompt 635 is true or false. As shown, if the individual selects TRUE (the correct answer), they would place a straw into the opening corresponding to TRUE, which would be the primary opening 618. If the individual were to select the incorrect answer of FALSE, they would place a straw into the opening corresponding to FALSE, which would be the secondary opening 619. As such, selecting the correct answer would result in a reward, while selecting an incorrect answer would not result in a reward.

Additionally, in the illustrated embodiment, a top wall 614 of the housing and a bottom wall 612 of the housing are circular, and a sidewall 613 is cylindrical, such that the housing is cylindrical in shape. The housing, being cylindrical in shape, defines the primary opening 618 on one side of the housing and the secondary opening 619 on an opposing side of the housing. A chamber wall 615 extending entirely from the bottom wall 612 to the top wall 614 of the housing defines the secondary chamber 617, while a chamber wall 615a that extends only partially from the top wall 614 to the bottom wall 612 of the housing defines a primary chamber portion 616a of the primary chamber 616. The primary chamber portion 616a is open into the rest of the primary chamber 616 defined by the housing 611. When placing a straw in the opening 618, 619, the user punctures a sealing membrane or the top wall.

Referring to FIGS. 8A-8D, there is shown a front exploded perspective view, a perspective view, a perspective view with parts removed, and a cross-sectional view. A housing 711 is a substantially rectangular cuboid defining a primary chamber 716 for holding liquids or solid pieces. The housing includes a front wall 782, a back wall 784, a first sidewall 786 and a second sidewall 788. A primary tab 733 and secondary tabs 734 substantially form each of four corners of the housing 711. The primary tab 733 includes a film seal member 735 and each secondary tab includes a film seal member 735. The seal member 735 can be in the form of a film or foil and includes an adhesive surface 735a. Removal of the primary tab 733 by peeling off the seal member 735 from the housing 711 reveals an opening 718 into the primary chamber 16. Removal of any of the secondary tabs 734 and peeling off the seal member 735 thereof will only reveal a solid wall portion of the housing.

The embodiment of FIGS. 8A-8D are particularly suited for dispensing solid particles as the opening 718 can be made larger than a typical straw opening. The embodiment also can be used with liquid contents.

The housing 711 provides recessed, oblique surfaces 733b, 734b (three) that define the primary chamber 716 along with the sidewalls 786, 788 and the front and back walls 782, 784. Only the oblique surface 733b includes an opening 718, if only one answer is correct.

For all embodiments, the primary opening is in communication with the primary chamber and the secondary openings are in communication with the secondary chambers.

Some features of the containers 10, 100, 200, 300, 400, 500, 600 and 700 are usable on any and all of the containers described herein. The barcode and similar codes, readable by a mobile device to display the questions and answer choices, can be used on any of the containers 10, 100, 200, 300, 400, 500, 600 and 700. The display with the questions and answers choices displayed on the container can be used on any of the containers 10, 100, 200, 300, 400, 500, 600 and 700. Additionally, by use of an electronic device, such as a smart phone, a user could keep a running tally of correct guesses by logging in to his player account before selecting an opening. The smart phone electronics could use an application that Included log-ins, teams, team scores and other interactive features.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A multi-chamber container, for dispensing a liquid, comprising:
   a housing defined by a bottom wall with a sidewall extending upward therefrom;
   the housing including a top wall disposed on the sidewall, opposite of the bottom wall;
   the housing defining a plurality of chambers;
   the plurality of chambers comprising of a primary chamber and at least one secondary chamber, the primary chamber being closed and each secondary chamber being closed;
   the housing defining a primary opening, wherein the primary opening provides access to the primary chamber when opened by a user, the primary opening being sealed by a first membrane portion to hold a dispensable liquid within the primary chamber;
   the housing defining at least one secondary opening, wherein each secondary opening provides access, when opened by a user, to a respective secondary chamber corresponding thereto, each secondary opening being sealed by a second membrane portion with each secondary chamber being empty;
   wherein a user can open the primary opening and the at least one secondary opening by rupturing a respective one of the first membrane portion or the second membrane portion by force from a drinking straw, and when a user opens the primary opening, a dispensable liquid can be dispensed, and wherein when a user opens the at least one secondary opening and sucks, dispensing of product from the primary chamber is prevented.

2. The multi-chamber container of claim 1, further comprising:
   a display disposed on an external surface of the housing;
   the display consisting of a primary indicia and at least one secondary indicia;
   a primary identifier placed in a proximate position to the primary opening;
   at least one secondary identifier additionally being displayed in a proximate position to each secondary opening corresponding to the secondary indicia.

3. The multi-chamber container of claim 2, wherein the display comprises a bar code, such that the display, the primary identifier and the at least one secondary identifier will be displayed on a mobile device when the bar code is scanned by the mobile device.

4. The multi-chamber container of claim 1, wherein the housing is cylindrical in shape.

5. The multi-chamber container of claim 1, wherein the sidewall is quadrilateral in shape.

6. The multi-chamber container of claim 1, wherein each secondary chamber is entirely fused to the top wall of the housing.

7. The multi-chamber container of claim 1, wherein each secondary chamber is tubular and extends downward from the top wall of the housing.

8. The multi-chamber container of claim 1, wherein the primary opening comprises a sleeve with a bottom opening allowing for access to the primary chamber.

9. The multi-chamber container of claim 1, wherein the plurality of chambers are defined by a plurality of chamber walls.

10. The multi-chamber container of claim 1, wherein the top wall of the housing comprises a reinforcement plate mounted and fused thereon to accommodate openings for one primary port leading to the primary chamber and at least one secondary port leading to a respective secondary chamber.

11. The multi-chamber container of claim 1, wherein the at least one secondary chamber opening comprises a sleeve with a bottom sealed to deny access to the primary chamber and contents thereof.

12. The multi-chamber container of claim 1, wherein the primary opening covered by the first membrane portion and any of the at least one secondary opening covered by the second membrane portion are indistinguishable from outside the container before opening any of the primary or at least one secondary openings.

13. A multi-chamber container, providing an educational function, comprising:
   a housing comprising a primary chamber and at least one secondary chamber, the primary chamber being closed to hold a dispensable liquid therein, each secondary chamber being closed to the primary chamber such that the dispensable liquid in the primary chamber is prevented from being drawn from the secondary chamber, the primary and the at least one secondary chamber having a respective selectable and user-openable primary port and a respective selectable and user-openable secondary port to access the inside of the respective primary and secondary chambers, the primary and the at least one secondary ports having a different user-recognizable indicia, and the user presented with a question with at least two answer choices, each answer choice having one of said indicia, the correct answer choice corresponding to the user-recognizable indicia corresponding to the primary port, the identity of the primary and the at least one secondary port not being distinguishable by the user;
   wherein the at least one secondary chamber comprises at least one sleeve depending from a respective secondary port, the sleeve sized and shaped to closely conform to an outside circumference of a drinking straw.

14. The multi-chamber container of claim 13, further comprising:
a display disposed on an external surface of the housing; the display including the question presented to the user and the at least two answer choices.

15. The multi-chamber container of claim 14, wherein the display comprises a bar code, such that the display, the primary identifier and the at least one secondary identifier will be displayed on a mobile device when the bar code is scanned by the mobile device, via an application.

16. The multi-chamber container of claim 13, wherein the primary port comprises a primary tab that is in operable connection with a primary seal that seals the primary port such that separation of the primary tab from the rest of the container, simultaneously reveals or ruptures the primary seal, allowing access into the primary chamber.

17. The multi-chamber container according to claim 13, wherein the primary chamber comprises a sleeve depending from the primary port, the sleeve sized and shaped to closely conform to an outside circumference of the drinking straw.

18. The multi-chamber container of claim 13, wherein the sidewall is quadrilateral in shape.

19. The multi-chamber container of claim 13, wherein each secondary chamber is entirely fused to the top wall of the housing.

20. The multi-chamber container of claim 13, wherein the housing comprises a primary tab and at least one secondary tab, the primary tab covers the primary opening and the at least one secondary tab covers respective secondary openings, the primary tab and the at least one secondary tab operable to open the respective primary opening and the at least one secondary opening.

21. The multi-chamber container of claim 13, wherein the top wall of the housing comprises a reinforcement plate mounted thereon.

22. A multi-chamber container, for dispensing a liquid, comprising:
a housing defined by a bottom wall with a sidewall extending upward therefrom;
the housing including a top wall disposed on the sidewall, opposite of the bottom wall;
the housing defining a plurality of chambers;
the plurality of chambers comprising a primary chamber and at least one secondary chamber, the primary chamber being closed and each secondary chamber being closed;
the housing defining a primary opening, wherein the primary opening provides access to the primary chamber when opened by a user, the primary opening being sealed by a first membrane portion to hold a dispensable liquid within the primary chamber;
the housing defining at least one secondary opening, wherein each secondary opening, when opened by a user, provides access to a respective secondary chamber corresponding thereto, each secondary opening being sealed by a second membrane portion with each secondary chamber being empty and closed to the primary chamber;
wherein a user can open the primary opening and the at least one secondary opening by rupturing the first membrane portion or the second membrane portion by force from a drinking straw, and when a user opens the primary opening, a dispensable liquid can be dispensed, and wherein when a user opens the at least one secondary opening and sucks, dispensing of product from the primary chamber is prevented;
wherein the primary chamber comprises a sleeve depending from the primary opening, the sleeve sized and shaped to closely conform to an outside circumference of a drinking straw;
wherein the at least one secondary chamber comprises at least one sleeve depending from a respective secondary opening, the sleeve sized and shaped to closely conform to an outside circumference of a drinking straw; and
each of the primary and secondary openings having a different user-recognizable indicia, and the user presented with a question with at least two answer choices, each answer choice having one of said indicia, the correct answer choice corresponding to the user-recognizable indicia corresponding to the primary opening, the identity of the primary and secondary openings not being distinguishable by the user.

23. A multi-chamber container, for dispensing a liquid, comprising:
a housing defined by a bottom wall with a sidewall extending upward therefrom;
the housing including a top wall disposed on the sidewall, opposite of the bottom wall;
the housing defining a plurality of chambers;
the plurality of chambers comprising a primary chamber and at least one secondary chamber, the primary chamber being closed and each secondary chamber being closed to the primary chamber;
the housing defining a primary opening, wherein the primary opening provides access to the primary chamber when opened by a user, the primary opening being sealed to hold a dispensable liquid within the primary chamber;
the housing defining at least one secondary opening, wherein each secondary opening, when opened by a user, provides access to a respective secondary chamber corresponding thereto;
wherein when a user opens the primary opening, a dispensable liquid can be dispensed, and wherein when a user opens each secondary opening and sucks, dispensing of product from the primary chamber is prevented;
wherein the at least one secondary chamber has a closed bottom on a different plane than the bottom wall of the housing and a sleeve depending from the primary opening that is open into the primary chamber.

* * * * *